United States Patent
Agrawal et al.

(10) Patent No.: US 11,086,181 B2
(45) Date of Patent: Aug. 10, 2021

(54) POLYMERIC ION-CONDUCTIVE ELECTROLYTE SHEET

(71) Applicants: Polyceed Inc., Tucson, AZ (US); Huntsman International LLC, The Woodlands, TX (US)

(72) Inventors: Anoop Agrawal, Tucson, AZ (US); Lori L. Adams, Tucson, AZ (US); John P. Cronin, Tucson, AZ (US); Lan Cao, Arlington, MA (US); Zarif Farhana Mohd Aris, Dracut, MA (US)

(73) Assignees: Polyceed, Inc., Tucson, AZ (US); Huntsman International LLC, The Woodlands, TX (US)

( * ) Notice: Subject to any disclaimer, the term of this patent is extended or adjusted under 35 U.S.C. 154(b) by 0 days.

(21) Appl. No.: 16/511,155

(22) Filed: Jul. 15, 2019

(65) Prior Publication Data

US 2020/0017649 A1 Jan. 16, 2020

Related U.S. Application Data

(60) Provisional application No. 62/698,284, filed on Jul. 16, 2018, provisional application No. 62/729,809, (Continued)

(51) Int. Cl.
*G02F 1/15* (2019.01)
*G02F 1/1516* (2019.01)
(Continued)

(52) U.S. Cl.
CPC ............ *G02F 1/15165* (2019.01); *B32B 7/12* (2013.01); *B32B 17/10302* (2013.01); (Continued)

(58) Field of Classification Search
CPC .......................... G02F 1/1503; G02F 1/15165
See application file for complete search history.

(56) References Cited

U.S. PATENT DOCUMENTS

| 5,189,549 A | 2/1993 | Leventis et al. |
| 5,352,504 A | 10/1994 | Boulanger et al. |
| | (Continued) | |

FOREIGN PATENT DOCUMENTS

| EP | 0867752 A1 | 9/1998 |
| WO | 2006094052 A2 | 9/2006 |
| | (Continued) | |

OTHER PUBLICATIONS

Omnexus. Polyvinylidene Fluoride (PVDF): Complete Guide, retrieved from: https://omnexus.specialchem.com/selection-guide/polyvinylidene-fluoride-pvdf-plastic on Oct. 8, 2019.*

(Continued)

*Primary Examiner* — Matthew E. Hoban
(74) *Attorney, Agent, or Firm* — Rothwell, Figg, Ernst & Manbeck, P.C.

(57) ABSTRACT

Methods and materials to fabricate electrochromic including electrochemical devices are disclosed. In particular, emphasis is placed on the composition, fabrication and incorporation of electrolytic sheets in these devices. Composition, fabrication and incorporation of redox layers and sealants suitable for these devices are also disclosed. Incorporation of EC devices in insulated glass system (IGU) windows is also disclosed.

15 Claims, 11 Drawing Sheets

Related U.S. Application Data filed on Sep. 11, 2018, provisional application No. 62/770,964, filed on Nov. 23, 2018, provisional application No. 62/807,461, filed on Feb. 19, 2019, provisional application No. 62/842,404, filed on May 2, 2019.

(51) Int. Cl.

| | | |
|---|---|---|
| E06B 9/24 | (2006.01) | |
| G02F 1/1333 | (2006.01) | |
| G02F 1/1335 | (2006.01) | |
| G02F 1/153 | (2006.01) | |
| G02F 1/161 | (2006.01) | |
| B32B 7/12 | (2006.01) | |
| B32B 17/10 | (2006.01) | |
| C03C 17/23 | (2006.01) | |
| C09J 153/00 | (2006.01) | |
| G02F 1/1503 | (2019.01) | |
| G02F 1/155 | (2006.01) | |
| C08G 18/24 | (2006.01) | |
| C08G 18/44 | (2006.01) | |
| C08G 18/73 | (2006.01) | |
| C08J 5/18 | (2006.01) | |
| C08K 5/00 | (2006.01) | |
| G02F 1/1523 | (2019.01) | |
| H01B 1/12 | (2006.01) | |
| H01M 10/0565 | (2010.01) | |

(52) U.S. Cl.
CPC ........ *B32B 17/10513* (2013.01); *C03C 17/23* (2013.01); *C08G 18/242* (2013.01); *C08G 18/44* (2013.01); *C08G 18/73* (2013.01); *C08J 5/18* (2013.01); *C08K 5/005* (2013.01); *C08K 5/0016* (2013.01); *C09J 153/00* (2013.01); *E06B 9/24* (2013.01); *G02F 1/133305* (2013.01); *G02F 1/133502* (2013.01); *G02F 1/15* (2013.01); *G02F 1/1503* (2019.01); *G02F 1/155* (2013.01); *G02F 1/1525* (2013.01); *G02F 1/1533* (2013.01); *G02F 1/161* (2013.01); *H01B 1/122* (2013.01); *C03C 2217/228* (2013.01); *C03C 2217/231* (2013.01); *C03C 2217/948* (2013.01); *C08J 2300/22* (2013.01); *C08J 2329/00* (2013.01); *C08J 2331/04* (2013.01); *C08J 2369/00* (2013.01); *C08J 2375/02* (2013.01); *C08J 2375/04* (2013.01); *C08K 2201/001* (2013.01); *C08K 2201/011* (2013.01); *E06B 2009/2464* (2013.01); *G02F 1/133325* (2021.01); *G02F 2001/1502* (2013.01); *G02F 2001/164* (2019.01); *G02F 2201/44* (2013.01); *H01M 10/0565* (2013.01)

(56) References Cited

U.S. PATENT DOCUMENTS

| | | | |
|---|---|---|---|
| 5,394,264 | A | 2/1995 | Marchese et al. |
| 5,724,187 | A | 3/1998 | Varaprasad et al. |
| 5,985,486 | A | 11/1999 | Giron |
| 6,002,511 | A | 12/1999 | Varaprasad et al. |
| 6,160,655 | A | 12/2000 | Fix et al. |
| 6,317,248 | B1 | 11/2001 | Agrawal et al. |
| 6,519,072 | B2 | 2/2003 | Nishikitani et al. |
| 6,560,004 | B2 | 5/2003 | Theiste et al. |
| 6,747,779 | B1 | 6/2004 | Morin et al. |
| 6,767,481 | B2 | 7/2004 | Berneth et al. |
| 6,791,737 | B2 | 9/2004 | Giron |
| 6,816,298 | B2 | 11/2004 | Nishikitani et al. |
| 7,012,306 | B2 | 3/2006 | Armgarth et al. |
| 7,110,157 | B2 | 9/2006 | Beteille et al. |
| 7,579,112 | B2 | 8/2009 | Chiang et al. |
| 7,582,895 | B2 | 9/2009 | Armgarth et al. |
| 7,791,784 | B2 | 9/2010 | Giron et al. |
| 7,988,746 | B2 | 8/2011 | Chiang et al. |
| 8,115,984 | B2 | 2/2012 | Agrawal et al. |
| 8,168,326 | B2 | 5/2012 | Chiang et al. |
| 8,206,469 | B2 | 6/2012 | Chiang et al. |
| 8,593,714 | B2 | 11/2013 | Agrawal et al. |
| 8,865,998 | B2 | 10/2014 | Huang et al. |
| 8,992,719 | B2 | 3/2015 | Shang |
| 9,013,777 | B2 | 4/2015 | Frey et al. |
| 9,030,724 | B2 | 5/2015 | Agrawal et al. |
| 9,164,345 | B2 | 10/2015 | Konkin et al. |
| 9,309,274 | B2 | 4/2016 | Van Der Boom et al. |
| 9,482,921 | B2 | 11/2016 | Lamine et al. |
| 9,535,306 | B2 | 1/2017 | Oukassi et al. |
| 9,640,334 | B2 | 5/2017 | Yu et al. |
| 9,864,250 | B2 | 1/2018 | Garcia et al. |
| 9,990,578 | B2 | 6/2018 | Johnson et al. |
| 2003/0094599 | A1 | 5/2003 | Le et al. |
| 2003/0099884 | A1 | 5/2003 | Chiang et al. |
| 2004/0018431 | A1 | 1/2004 | Gozdz et al. |
| 2005/0213184 | A1 | 9/2005 | Beteille et al. |
| 2008/0192407 | A1 | 8/2008 | Lu et al. |
| 2009/0284821 | A1 | 11/2009 | Valentin et al. |
| 2011/0278170 | A1 | 11/2011 | Chiang et al. |
| 2012/0212794 | A1 | 8/2012 | Giron et al. |
| 2013/0278989 | A1 | 10/2013 | Lam |
| 2013/0286458 | A1 | 10/2013 | Lamine et al. |
| 2016/0124284 | A1 | 5/2016 | O'Keeffe |
| 2017/0158878 | A1* | 6/2017 | Zheng ..................... C09D 5/00 |
| 2019/0233599 | A1* | 8/2019 | Hamon ................. B32B 27/304 |

FOREIGN PATENT DOCUMENTS

| | | |
|---|---|---|
| WO | 2018009645 A1 | 1/2018 |
| WO | 2018128906 A1 | 7/2018 |

OTHER PUBLICATIONS

Khutia. Synthesis and characterization of polyvinyl alcohol/cationic polyurethane binder blend as solid polymer electrolyte. Ionics (2015) 21:3075-3086.*

Ebnesajjad. Introduction to Fluoropolymers Materials, Technology and Applications. Elsevier Amsterdam. 2013, pp. 63-89.*

Lyoo. Preparation of High Molecular Weight Polyvinylalcohol by Low Temperature Azoinitiator. Eur. Polym. J. vol. 33, No. 5, pp. 785-787, 1997.*

Fragiadakis et al., "Molecular Mobility, Ion Mobility, and Mobile Ion Concentration in Poly(ethylen oxide)-Based Polyurethane Ionomers", Macromolecules, 2008, 41, 5723-5728 (Abstract only).

Nasirzadeh, K. et al, "Vapor-Pressure Measurements of Liquid Solutions at Different Temperatures: Apparatus for Use over an Extended Temperature Range and Some Data", J. Chem. Eng. Data 2004, 49, 3, 607-612 (Abstract Only).

Hart, R., Selkowitz, S. & Curcija, C. "Thermal performance and potential annual energy impact of retrofit thin-glass triple-pane glazing in US residential buildings." Build. Simul. (2019) 12: pp. 79-86. https://doi.org/10.1007/s12273-018-0491-3 (Abstract only).

Maged A. Osman, Vikas Mittal, Massimo Morbidelli, and Ulrich W. Suter, "Polyurethane Adhesive Nanocomposites as Gas Permeation Barrier", Macromolecules, 2003, 36 (26), pp. 9851-9858 (Abstract only).

Edwin S. Raj* and Jonathan Booth, "Lowering the Silver Content in Automotive Conductive Pastes", Johnson Matthey Technol. Rev., (2017), 61, (2), pp. 156 to 164.

Provisional Opinion and Partial International Search Report cited in PCT/US2019/041777, dated Oct. 9, 2019, 21 pages.

Non Final Office Action cited in U.S. Appl. No. 16/511,174 dated Sep. 12, 2019, 30 pages.

Hegedus, "Rutile Titanium Dioxide and its use in Polymer Systems", Air Vehicle and Crew Systems Technology Department (Code 6062), Naval Air Development Center, Report N. NADC-89008-60, AD-A206 787, Jan. 5, 1989, 19 pages.

(56) References Cited

OTHER PUBLICATIONS

Sun et al., "Room-Temperature Molten Salts Based on the Quaternary Ammonium Ion", J. Phys. Chem. B 1998, 102, pp. 8858-8864.

* cited by examiner

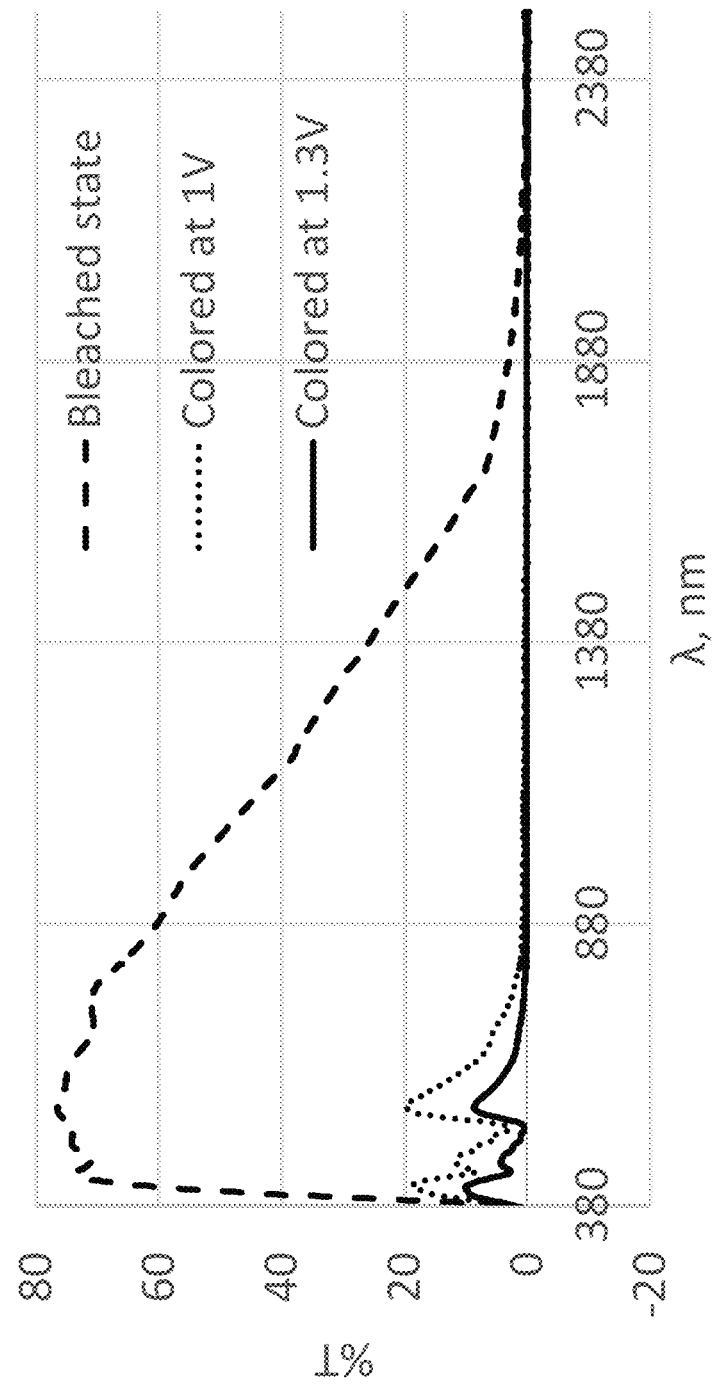

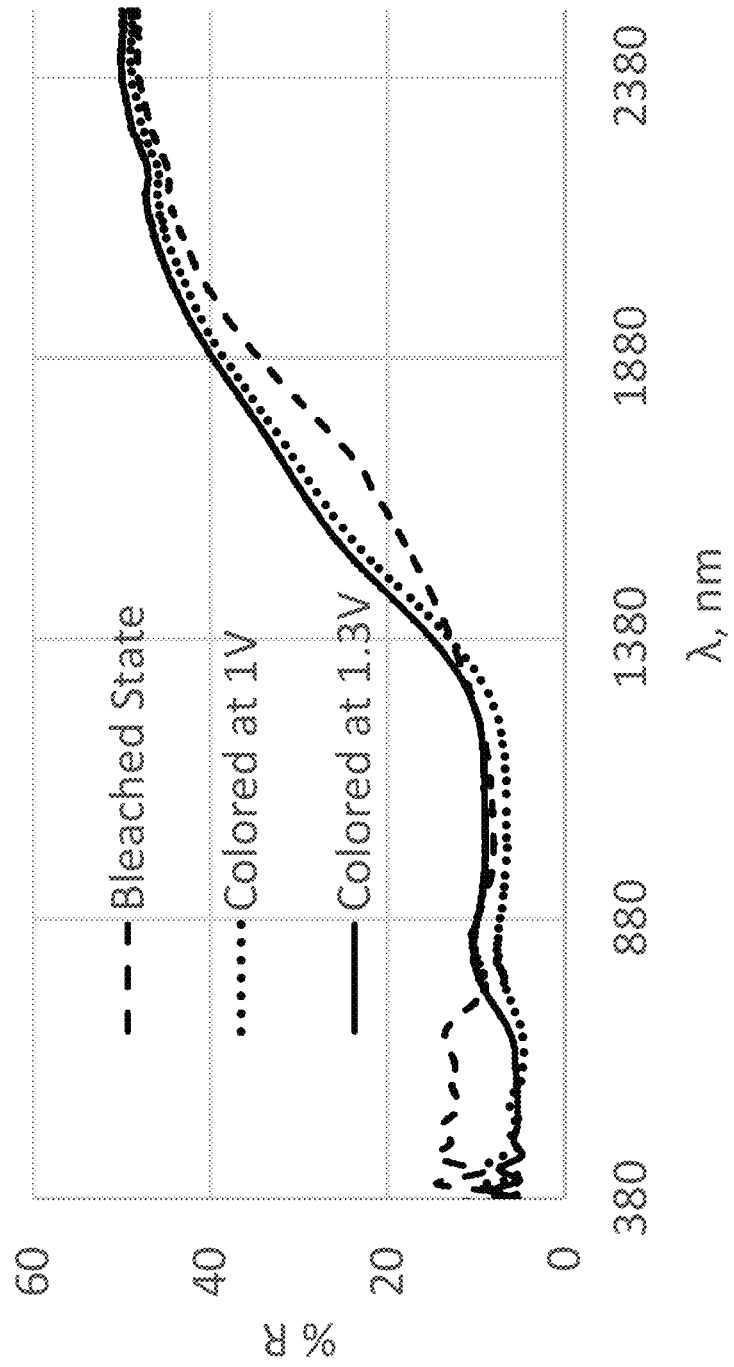

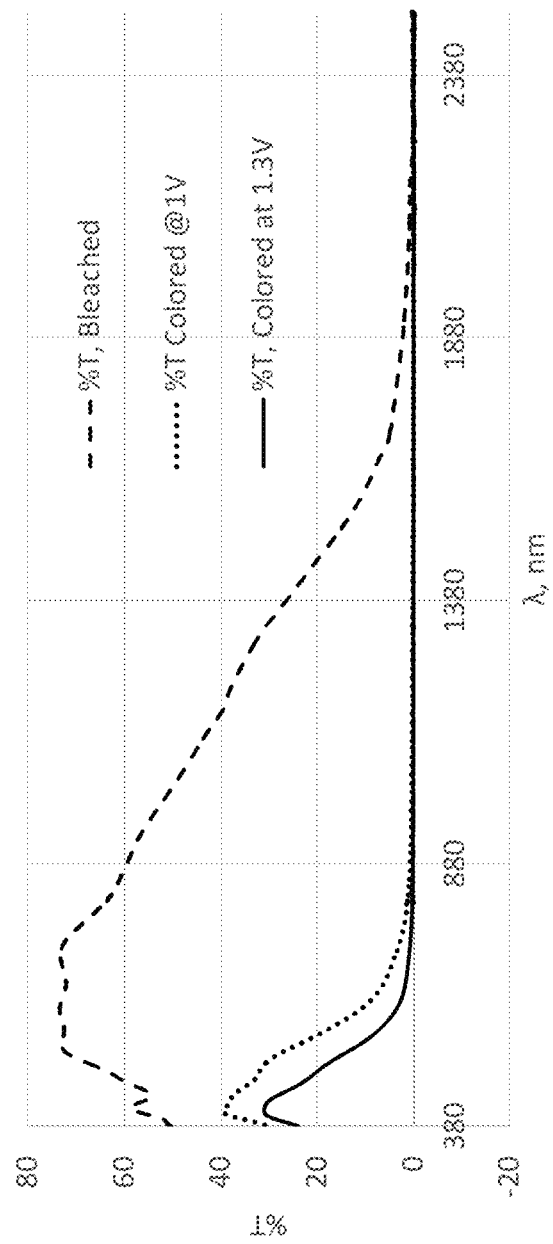

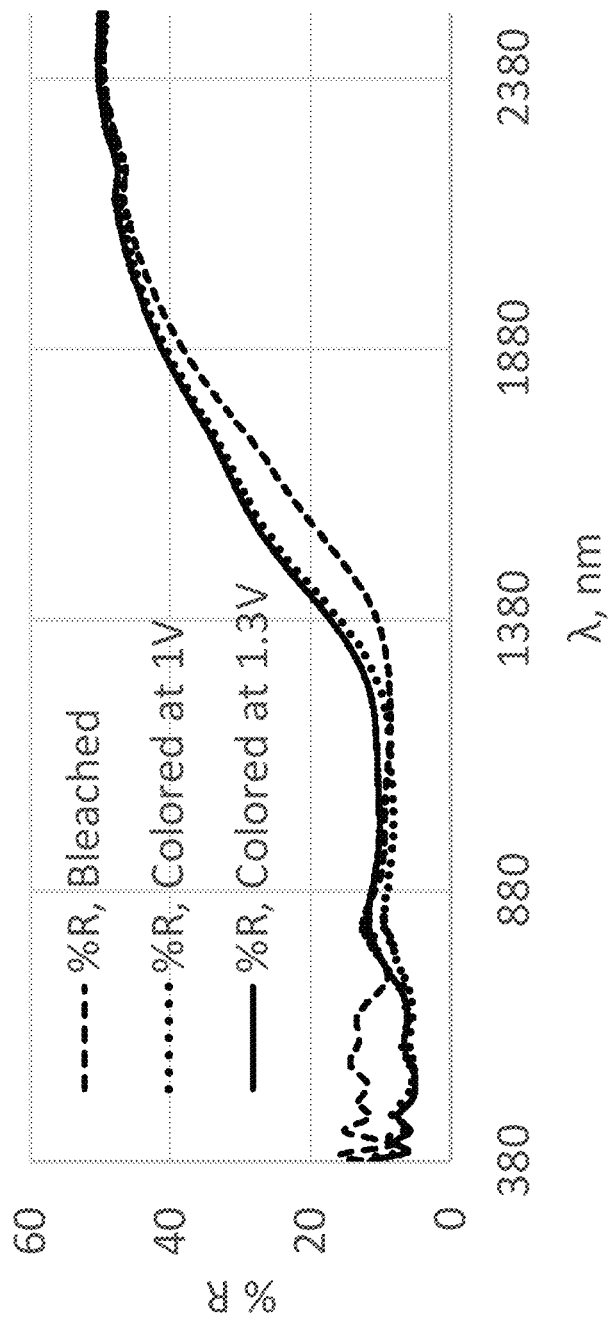

POLYMERIC ION-CONDUCTIVE ELECTROLYTE SHEET

CROSS-REFERENCE TO RELATED APPLICATIONS

This application claims priority to U.S. provisional application Ser. No. 62/698,284, filed on Jul. 16, 2018; U.S. provisional application Ser. No. 62/729,809, filed on Sep. 11, 2018; U.S. provisional application Ser. No. 62/770,964, filed on Nov. 23, 2018; U.S. provisional application Ser. No. 62/807,461 filed on Feb. 19, 2019, and U.S. provisional application Ser. No. 62/842,404, filed on May 2, 2019.

FIELD OF THE INVENTION

The present invention relates to polymeric compositions for use in variable light transmission devices (including electrochromic devices), their use in windows systems, and their use in other electrochemical devices such as batteries (including secondary batteries) and actuators.

BACKGROUND OF INVENTION

Variable transmission devices are used to make "smart glass" or "smart windows" where the light transmission or reflection characteristics of a window are changed by electronic switching. These devices may be used for variable transmission windows for use in buildings and transportation, displays and automotive mirrors for controlling reflectivity. When used in construction of buildings and in transportation, these windows result in energy efficient envelopes by regulating the solar energy penetration through the windows. The invention will be principally illustrated as it applies to electrochromic devices (which are electrochemical in nature), but many aspects of this may be used for any type of variable transmission devices, and other electrochemical applications.

SUMMARY OF THE INVENTION

The present disclosure includes an electrochemical device having a first substrate with a conductive coating; a redox layer in contact with the conductive coating; and an electrolyte layer comprising a first polymer wherein the electrolyte layer is in contact with the redox layer, the electrolyte and the redox layer both further comprising a plasticizer and a salt, wherein:
(i) the electrolyte and the redox layer contain the same plasticizer; and
(ii) the concentration of dissociable salt based on plasticizer amount is similar in concentration in the redox layer and the electrolyte, and
the redox layer further comprises (a) a second polymer material, (b) a redox agent and (c) electrically conductive particles.

The present disclosure includes an electrochemical device, comprising an electrolyte layer comprising a first polymer and a first plasticizer wherein the electrolyte layer is in contact with a redox layer comprising a second polymer and a second plasticizer, wherein the first and the second plasticizers are the same; and at least one monomer component of the first polymer and at least one monomer component of the second polymer are miscible with the first plasticizer and the second plasticizer.

The present disclosure includes an electrochemical device comprising: a first substrate with a conductive coating and a second substrate with a conductive coating; a first redox layer in contact with the coating on the first substrate; a second redox layer in contact with the conductive coating on the second substrate; an electrolyte layer in contact with the first and second redox layers and sandwiched between the two substrates; a sealant located at the perimeter of the device that seals the redox layers and the electrolyte from the environment, wherein the sealant comprises a thermoplastic polymer selected from at least one of polyurethane and polyurea which further contains crosslinkable groups capable of crosslinking by addition polymerization.

The present disclosure includes an electrochemical device comprising: a) a redox layer comprising a first composition; b) an electrolyte layer comprising a second composition, wherein the said redox layer and the electrolyte layer are bonded together by a polymeric network which permeates both the said layers.

The present disclosure includes a method of making an ion-conductive polymer film for an electrochromic device, wherein the method comprises: mixing one or more monomers capable of forming a thermoplastic polymer, a plasticizer, a salt which is soluble in the plasticizer, a UV stabilizer, and a polymer-forming catalyst to form a mixture; polymerizing the mixture to obtain a formulation containing a thermoplastic polymer; and extruding or casting the formulation to form said ion-conductive film.

The present disclosure includes a polymeric ion-conductive electrolyte sheet comprising: i) thermoplastic polymer formed using at least three monomers; ii) a melting point or a flow point in excess of about 90° C. and less than about 170° C.; and iii) optical haze less than 5%.

The present disclosure includes a polymeric ion-conductive (electrolyte) sheet comprising: i) a thermoplastic polymer; and ii) a monomer, wherein the said monomer is capable of polymerizing into a second polymer which is crosslinked.

The present disclosure includes a polymeric ion-conductive (electrolyte) sheet comprising: a thermoplastic polymer, wherein the thermoplastic polymer further comprises available polymerizable groups, and wherein the thermoplastic polymer has a melting point or a flow point in excess of about 60° C. and less than about 170° C.

The present disclosure includes a polymeric ion-conductive sheet comprising i) a thermoplastic polymer selected from one of polyurethane, polyester, polyurea, polycarbonate, or a combination thereof and ii) further comprising at least one of non-electronically conductive nanoparticles and surface modified non-electronically conductive nanoparticles, wherein the polymeric ion-conductive sheet has an optical haze of less than 5%.

The present disclosure includes a device comprising an electrochromic electrode layer and a counterelectrode layer sandwiching an electrolyte layer wherein a polymeric network permeates through the electrolyte layer and at least one of the electrochromic electrode and the counterelectrode.

The present disclosure includes a perimeter sealant for an electrochromic device comprising a melt processable block copolymer, wherein (a) a first phase of the block copolymer has lower permeability to air and water and (b) a second phase of the block copolymer determines its flow or melting point which is in excess of 100° C. and (c) the first phase has a volume fraction that is greater than that of the second phase.

The present disclosure includes an insulated glass unit (IGU) comprising an electrochromic (EC) element which is (a) capable of reversibly varying the Solar Heat Gain Coefficient (SHGC) of the said IGU from about a range between 0.25 and 0.55 down to a range between 0.03 and 0.15 and (b) has a low-emissivity (Low-E) coating and (c) the said IGU has a thermal resistance (R value) of greater than 5.

The present disclosure includes an insulated glass unit (IGU) comprising a glass electrochromic element and (a) a privacy glass element capable of reversibly changing its optical state from clear to opaque due to application of an electrical voltage, (b) has at least one glass surface having a low-emissivity (Low-E) coating, and (c) has a thermal resistance (R value) of greater than 5.

The present disclosure includes an insulated glass unit (IGU) comprising an electrochromic (EC) element which is (a) capable of reversibly varying the Solar Heat Gain Coefficient (SHGC) of the said window from about a range between 0.25 and 0.55 down to a range between 0.03 and 0.15 and (b) a VIG element and (c) the said IGU has a thermal resistance (R value) of greater than 5.

The present disclosure includes a method of forming an electrochromic device, comprising: providing a first coated substrate; providing a second coated substrate; and laminating a pre-formed polymeric electrolyte sheet between the first and second coated substrates, which wherein the pre-formed polymeric electrolyte sheet comprises at least one polymer, at least one plasticizer and at least one electrochromic bridged dye, which are dispersed throughout the sheet.

Other features and characteristics of the subject matter of this disclosure, as well as the methods of operation, functions of related elements of structure and the combination of parts, and economies of manufacture, will become more apparent upon consideration of the following description and the appended claims, all of which form a part of this specification.

BRIEF DESCRIPTION OF FIGURES

FIGS. 10 and 11 show the transmission and reflection characteristics of an EC glass;

FIGS. 12 and 13 show transmission and reflection characteristics of an EC glass with different optical characteristics.

DETAILED DESCRIPTION

Figure 1:
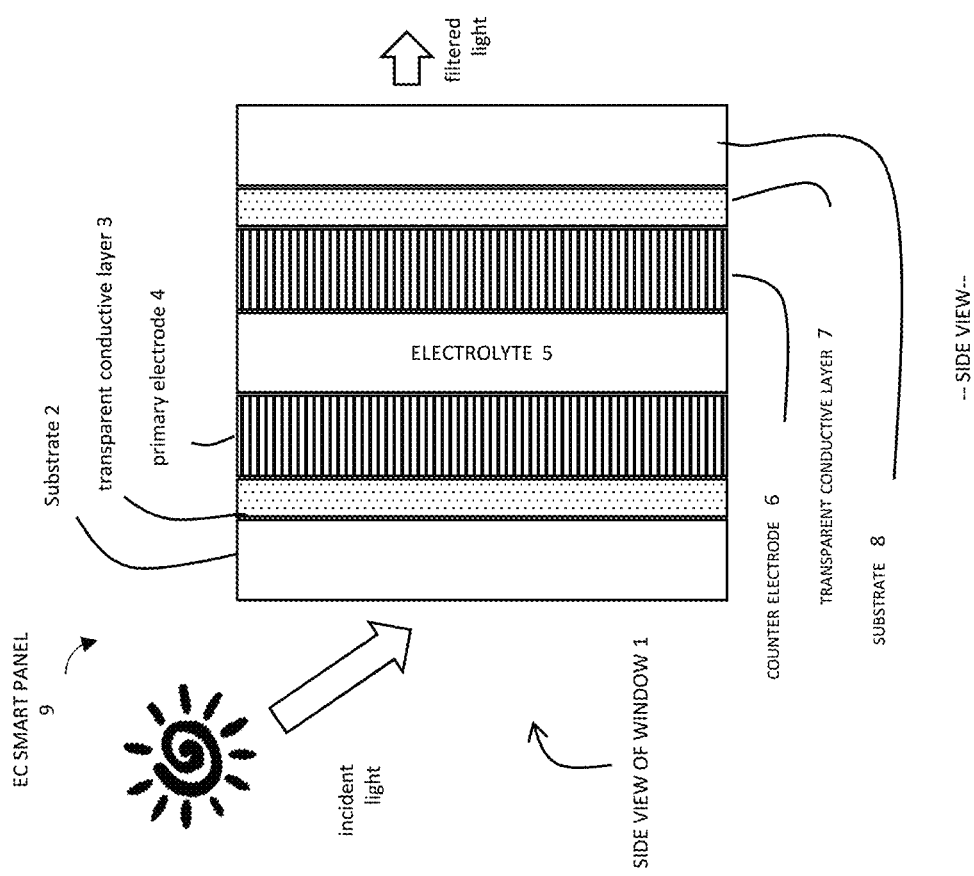
FIG. 1 illustrates schematics of an electrochromic (EC) panel for use in a smart window.

While aspects of the subject matter of the present disclosure may be embodied in a variety of forms, the following description is merely intended to disclose some of these forms as specific examples of the subject matter encompassed by the present disclosure. Accordingly, the subject matter of this disclosure is not intended to be limited to the forms or embodiments so described.

The singular forms "a," "an," and "the" include plural referents unless the context clearly dictates otherwise.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. Furthermore, such an interpretation should apply regardless of the breadth of the range or the characteristics being described. Additionally, it is noted that all percentages are in weight, unless specified otherwise.

In understanding the scope of the present disclosure, the terms "including" or "comprising" and their derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms "including", "having" and their derivatives. The term "consisting" and its derivatives, as used herein, are intended to be closed terms that specify the presence of the stated features, elements, components, groups, integers, and/or steps, but exclude the presence of other unstated features, elements, components, groups, integers and/or steps. The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps. It is understood that reference to any one of these transition terms (i.e. "comprising," "consisting," or "consisting essentially") provides direct support for replacement to any of the other transition term not specifically used. For example, amending a term from "comprising" to "consisting essentially of" would find direct support due to this definition.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein. For example, in one aspect, the degree of flexibility can be within about ±10% of the numerical value. In another aspect, the degree of flexibility can be within about ±5% of the numerical value. In a further aspect, the degree of flexibility can be within about ±2%, ±1%, or ±0.05%, of the numerical value.

Generally herein, the term "or" includes "and/or."

As used herein, a plurality of compounds or steps may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Furthermore, certain compositions, injuries or conditions, steps, or the like may be discussed in the context of one specific embodiment or aspect. It is understood that this is merely for convenience, and such disclosure is equally applicable to other embodiments and aspects found herein. Prior disclosures failed to recognize how to use redox layers which contain plasticizers and dissociable salts, in combination with specific electrolytes and how certain chemistries of electrolytes may be manufactured at scale. Further, prior disclosures did not teach how copolymers should be used to make such electrolytes, how their interaction with other ingredients such as plasticizers and salts is controlled, and how the desired properties such as ion conductivity and optical properties are achieved. Prior disclosures did not address the problems with electrochemical devices where the redox layers have very different compositions, or the solutions found by the present inventors regarding matrix materials and processing profiles which need to be combined to achieve a high degree of interfacial compatibility between the layers. Prior disclosures failed to address the compositions and properties of electrolytes required so that such sheets may be manufactured, transported, and eventually processed into and used in window devices for use different climatic and weather conditions. Prior disclosures failed to provide practical means or examples where such layers are incorporated into devices. Thus, it is difficult for a person of ordinary skill in the art to understand or predict the difficulties or problems which need to be resolved to provide compatibility between the electrolyte and redox layers from a processing, functional and durability perspective. Prior disclosures failed to provide details of layer compositions, forming such layers and then incorporating them in devices. Prior disclosures failed to provide insight into compositional details of redox layers and electrolytes so that these could be made compatible and durable. Prior disclosures failed to disclose methods to form such layers and incorporate them in devices so that these can be manufactured at scale. Further, prior disclosures failed to address the various configurations of window systems where EC elements may be used to provide superior insulation and dynamic transmission control over the solar spectrum.

An object of this invention is to form a low-cost, high performance and durable electrochromic (EC) devices for windows used for architectural and transportation applications. These applications also include overhead windows such as skylights and sunroofs. The EC devices may be configured using a selection of certain material compositions for use as electrodes, electrolytes and sealants. There are also a variety of manufacturing methods disclosed herein enabling their fabrication.

Another objective of the invention is to disclose certain polymeric ion-conductive (electrolyte) compositions to accomplish this task.

Yet another objective of the invention is to disclose polymeric electrode materials which undergo reversible reduction or oxidation (collectively called redox), particularly as used in electrochemical devices including electrochromic devices.

A further objective is to provide perimeter sealants to protect these devices from the atmospheric elements.

This invention focuses on electrochemical devices in general, and in particular on electrochromic devices. The focus is on both methods of fabrication and material composition of the polymeric electrolyte layers, redox layers and perimeter sealants which are used in these devices and the device itself.

In a device it is important to have good adhesion and compatibility between the redox layer and the electrolyte, so that resistance to ion transport at this interface is low. When both of these layers (redox and the electrolyte layer) contain plasticizers and ionically dissociated (or solvated) salts, and the ions from these are the source of mobile ions, it is important that when such layers come in contact a good balance of these components is to be maintained in these layers while the device is functional over its lifetime. For this, it is preferred that the plasticizer composition and the salt type in both layers is similar, second, there is preference that the salt concentration in the plasticizer within these layers be also similar, that is within 10%. It is desirable that this similarity is maintained in each of the layers at the time of device fabrication, or at least this is achieved any time after the device has been fabricated and an equilibrium is established by exchange of plasticizers and the salt between the two layers.

Plasticizers are low molecular weight liquids (usually in the range of 85 to 600 daltons) which remain liquids in the temperature range of the device operation, and do not react with the layers they are in to provide high mobility to the ions, and also have a large electrochemical window in which they are stable and do not undergo redox activity when the electrochromic device is colored or bleached. Further, when salts are added to the system containing these plasticizers, to provide ion-conductivity, it is desirable that such salts should be soluble in this plasticizer so that they can dissociate into ions. A plasticizer for an electrochromic device may contain more than one material. It is desirable to also have other components be miscible in the plasticizer which include, e.g., UV stabilizers.

One of the redox layers in these devices may comprise conductive nanoparticles including carbon nanotubes (CNTs) and redox materials. These CNTs may be single walled, double walled, triple walled or multiwalled, although the first three types (or predominantly their mixtures) are preferred for electrochromic devices so that optical transmission is high. The conductive particles are present in a concentration so that they are percolated and provide electronic conductivity through the redox layer thickness. The polymers used for the redox layers and the electrolyte layers may be any including fluoropolymers, however, in this invention one particular focus is on polymers formed by reacting isocyanates with proton reactive compounds (e.g., polyurethanes formed by reacting isocyanates and polyols and polyureas formed by reacting isocyanates with polyamines). The redox materials in the redox layer are preferably tethered to the polymeric matrix (covalently attached) or bonded to the conductive particles or both. This stops the redox agents from being transported into the electrolyte layer. In general, since these devices are made by sandwiching a preformed electrolyte film, it is desirable that a thermoplastic electrolyte film is used that is laminated between two coated substrates to form the device. The device contains at least one polymeric redox layer coating on one of the substrates.

It is important that the polymers used in the electrolyte film and the redox layer themselves be compatible with the plasticizers. One way to ensure this is to have at least one of the monomers used to form these polymers be soluble in the plasticizer (or in other words be miscible, about in the same proportion as used in the device, i.e., that they have similar solubility characteristics). For example, if these layers are formed using urethanes, then at least one of the monomers used to form the urethane is soluble in the plasticizer (i.e., this solubility is determined before the monomer reacts and forms the urethane). In particular, it is desired that the polyol used to form the soft segments in the thermoplastic urethane in the electrolyte film be soluble in the plasticizer (i.e., miscible), and further, the same or a different polyol with similar solubility characteristics (and in a specific embodiment with a similar molecular weight) be used in the redox layer.

Those polymers which are used as perimeter sealants in these devices should have no or very low solubility and permeability to any of the components used within the device, particularly the plasticizer. If polyurethanes are selected for perimeter sealants then the monomers used to form them should not be miscible or form homogenous solutions with the plasticizers. The devices of this invention may have multiple sealants with different compositions and processability profiles with low moisture permeation to improve the reliability. For example, in addition to the sealants described here butyl sealants may also be used, which are known for low moisture and air permeation.

The thermoplastic electrolyte sheets and the redox layers used to fabricate these devices may also form covalent bond during the device processing step when the electrolyte sheet is being incorporated into the device, i.e., between 1 second to 120 minutes, 5 seconds to 90 minutes, 10 seconds to 60 minutes, 30 seconds to 30 minutes, 1 minute to 15 minutes, including any range of time in the disclosed ranges, after the electrolyte sheet has been incorporated. One method to accomplish this is by using a different reaction mechanism as compared to the one used to form the urethanes for these layers. This may be achieved by incorporating groups in the urethane forming monomers, which could be polymerized during device processing using addition polymerization. Such polymerization may be activated by heat or radiation. The sealants used for perimeter seals may also be cross-linked using addition polymerization once the sealants are in place within the device structure. The sealants may also have additives (in particular inorganic additives) to reduce their permeability to not only components migrating out from within the device but also to stop moisture and air from entering into the device.

The use of EC devices is described for fabricating high energy efficiency insulated glass unit (IGU) window systems. These windows have high thermal insulation and also desirable range of solar heat gain coefficient. Further, they provide good visibility and also protect the occupants from undesirable glare. These windows may also have other electrooptical elements (such as glass panels which comprise liquid crystalline materials and change from being clear to hazy by applying an electrical stimulus so that they can provide privacy on demand.

The EC devices of this invention may also be formed on flexible substrates, which may then be used for retrofit applications for windows of buildings and for transportation (vehicles, buses, trains, planes, boats, etc.).

EC Device Construction

For architectural use, EC devices or window panels may be incorporated as one of the two or three glass panels into dual or triple pane integrated glass units (IGUs). These IGUs are used in energy efficient building envelops. For interior panels where the panels provide a certain level of privacy, it is not necessary to utilize IGU type constructions. For transportation, EC windows may be incorporated either way depending on the requirements. These windows are also called "smart" windows.

The EC panel or EC glass for use in windows are multilayered structures formed using one or two transparent substrates. In one typical construction formed by taking two transparent substrates, such as glass or plastic, and depositing an electrically conductive and transparent coating on one side of each of the substrates; these materials are referred to as transparent conductors (TCs). Depending on the details of the EC device, optional coatings called redox layers are deposited on these TCs. With the substrates positioned in a parallel configuration, and with the coated sides facing each other, a polymeric electrolyte is sandwiched between the coated substrates. The perimeter is sealed to encapsulate the redox layers and the electrolyte. A coloration potential is applied at the conducting coatings of the opposing substrates which alters the color of the system, i.e. of the color change takes place in redox coatings and/or the electrolyte.

FIG. 1 illustrates a side-view of an EC panel having a multi-layer structure formed using two substrates.

The side-view of EC smart panel 9 of smart window 1 is configured with two opposing substrates 2, 8, having layers therebetween. For a window application, the substrates 2, 8 are transparent glass or plastic. In the illustrated example, both substrates 2, 8 have a transparent electronically conductive (TC) layers 3, 7, respectively. Other layers include layers 4, 6, the EC layer and counter electrode respectively, both considered as redox layers as they undergo reduction and oxidation as discussed below. Between the electrodes 4, 6, is an ion-conducting (electrolyte) material 5. When an electric potential is applied between conductive layers 3 and 7, the redox layer in contact with the negative terminal (e.g., layer 4) reduces, while the layer in contact with the positive terminal (e.g., layer 6) oxidizes. In addition, the layer being oxidized releases ions (such as lithium ions, $Li^+$) which are transported through the electrolyte layer 5 into the reducing layer. In addition, the electrons released are transported on the other side through the external powering circuit. This redox activity results in an optical color change or electrochromic activity. When the voltages are reversed, or the circuit is shorted between the two conductive layers 3 and 7, then this reaction is reversed with a reversal in optical properties and the previously reduced and oxidized layers oxidizing and reducing simultaneously. In this example, the electrode 4 is formed of an electrochromic (EC) material; and the counter electrode 6 may also be formed from a material which does not have electrochromic properties or an EC material which may be different from the one used in EC layer 4. In the latter case, the EC material of the counter electrode 6 has complementary electrochromic properties to those of the EC electrode 4. Which means if the EC layer 4 darkens (or changes its optical state from a more transmitting state to a less transmitting state) due to reduction (i.e., insertion of cations and electrons from the conductive electrode adjacent to it) then simultaneously layer 6 also colors because of oxidation.

Figure 5:
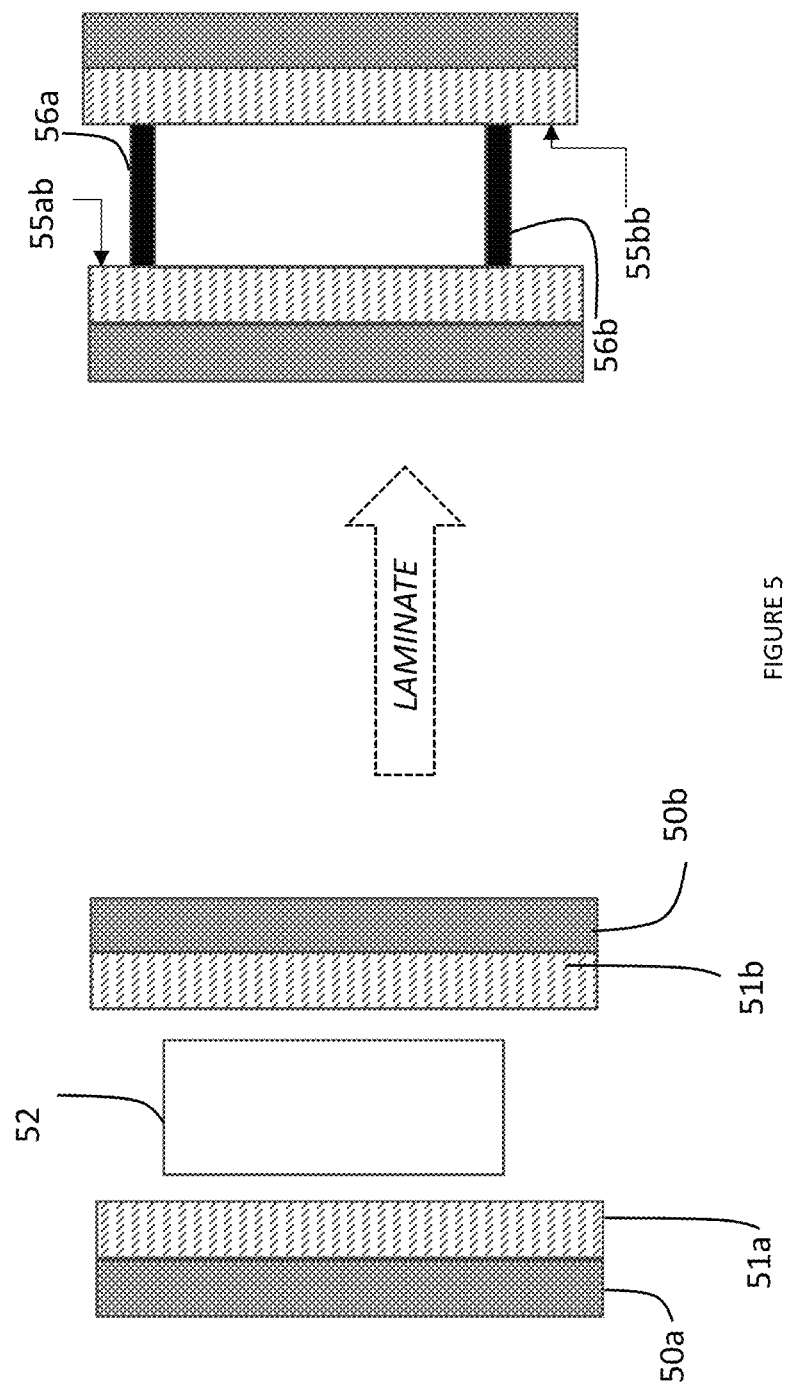
FIG. 5 illustrates an EC device and its construction according to some of the embodiments of the present invention.

FIG. 5 shows another type of EC device construction where all of the redox materials are incorporated in the electrolyte. These redox species may be attached to the matrix polymer of the electrolyte, or they may be free to move within this layer, or part of these may be attached to the polymer or part of them are free to move. Such EC device is made by laminating this electrolyte layer between a pair of conductive substrates or substrates coated with conductive layers where at least one of them is transparent, and for windows all substrates (e.g., glass or plastic) and conducting layers (e.g., indium-tin oxide, fluorine doped tin oxide, etc.) are transparent.

The EC pane or device in one embodiment comprises several components: The polymeric ion-conductive electrolyte layer, a pair of redox electrodes at least one of which has electrochromic properties, perimeter sealant and busbar conductors, which are discussed in detail below.

Polymeric Ion-Conductive (Electrolyte) Layer

Since the ion conductive layer 5 (FIG. 1) is in contact with the two redox layers 4 and 6 and exchanges ions with them, its contact to these layers is important. Particularly for window applications, electrolyte layer 5 when solid may also provide safety properties to the window so that if the glass (substrate) breaks, its pieces are kept well adhered to this (electrolytic) layer rather than to fall off and cause injury. Safety glazing is tested by passing the test ANSI Z97.1 from Accredited Standards, Committee (Vienna, Va.). In addition, the glass substrates used for EC panels may be strengthened and or tempered.

The ion-conductive layer is constructed out of transparent polymers to provide transparency and structural/safety properties and other ingredients so that these have good adhesion to the materials it is in contact with, good ion-conductive properties, UV and thermal stability. For example, for most battery applications the transparency and the UV stability of this layer are not important. The total ion-conduction of the electrolyte depends on the intrinsic conductivity of the ion conductor layer, its area and its thickness. In other words, total conductivity in S for a unit area (one square cm), the ion-conductivity of the layer would be its inherent or specific ion-conductance in S/cm divided by the thickness of the film in cm. For practical window devices in a size of about 30×30 cm or larger (or larger than 900 sq cm), a preferred range of the electrolyte layer thickness is from about 100 microns to about 1,000 microns.

It is desirable that at room temperature (25° C.) the ion-conductance of these films (for one square cm area) in the thickness used is higher than $10^{-5}$ S. In another embodiment this should be higher than $10^{-}$S. Usually, the desire for increasing conductivity in electrolytic layer will be restricted by the desire to have increasing rigidity which is important for structural properties, thus for most devices total conductivity at room temperature (25° C.) will be in the range of $10^{-2}$ S to $10^{-4}$ S.

The conductivity of ion conductors decreases with temperature; thus compositions should be selected so that their conductivity should not reduce by more than a factor of 10 as compared to room temperature when the temperature drops to 0° C. and in another embodiment the factor of 10 reduction should materialize only when the temperature drops to −10° C. For superior low temperature performance, the Tg (glass transition temperature) of the plasticized polymer should be about 20° C. or lower as compared to the lowest temperature at which the windows would be switched. The lowest switching temperature in one embodiment is 0° C., in another embodiment −20° C. and yet in another embodiment −40° C. This can also be controlled by selecting the type of plasticizer. Thus, in one embodiment, the plasticizers may be liquids which have solidification point (Tg or melting point) below the lowest switching temperature. Further, other constituents being the same, for polymeric ion-conductors ion conduction could be varied by changing its thickness and the plasticizer amount and lithium ion concentration. In some aspects, lithium ions are provided by the solvated salt. In some aspects, the salt concentration may range from about 0.05M to about 2M based on the plasticizer content and in another embodiment from about 0.1M to about 1M, including but not limited to e.g., about 0.2M, 0.3M, 0.4M, 0.5M, 0.6M, 0.7M, 0.8M. If the higher molarity of salt is being used to gain the performance at specific low temperature where the device needs to be switched, it has to be checked that the salt is still solvated at that temperature. Further, those thermoplastic polyurethanes (TPU) compositions are preferred which, without the plasticizer and the salt, have a low Tg. In one embodiment this Tg should be below 0° C. and in another embodiment below −20° C. (negative 20° C.).

The optical clarity of the films should be high and optical haze must be low. Since, many of these ion-conductive films may have a texture on their surfaces for ease of removing entrapped air bubbles in processing, these properties are only measured when these films are laminated between two substrates. The optical properties including haze of the electrolyte film are measured by laminating the electrolytic sheet between about 2.3 mm thick clear soda lime glass (with standard iron content ~0.1%) and then measuring haze and transmission properties. The haze in the electrolyte for windows in vertical configuration should be lower than 2%, and in another embodiment lower than 1%. For overhead windows such as skylights and sunroofs, higher haze in the electrolyte can be tolerated, up to 5%. The transparency of these laminates should be in excess of 65%, and in another embodiment equal to or greater than 85%. Haze may be measured by using a standard test method ASTM D1003 and clarity by measuring transmission at the peak of photopic eye response which is at about 550 nm.

The ion-conductive properties may be imparted to polymeric compositions by the polymers themselves which may have ionic groups, but in many instances, this is imparted by adding plasticizers which are compatible with the polymeric matrix in which metal ion salts are dissolved (such as lithium metal salts). Some examples of plasticizers are propylene carbonate, Y-butyrolactone, tetraglyme, sulfolane, monofluoroethylene carbonate, difluoroethylene carbonate, esters with molecular weights of less than 300, hydrophobic ionic liquids, and so forth. These may also be added in any proportion (i.e., one or a mixture of two or more plasticizers) as long as they are compatible with the system. In one embodiment which uses the solid electrolyte based on thermoplastic polymers, the ratio by weight of the polymer to the plasticizer is in the range of 4:1 to 1:4. Some examples of lithium metal salts with electrochemically stable anions and which dissolve and dissociate into anions and cations in plasticizers are triflate ($CF_3SO_3^-$), imide ($N(CF_3SO_2)_2^-$), beti (($C_2F_5SO_2)_2N^-$), methide ($CF_3SO_2)_3C^-$), tetraflouroborate ($BF_4^-$), hexaflourophosphate ($PF6^-$), hexafluoroantimonate ($SbF_6^-$), bis(fluorosulfonyl)imide ($N(FSO_2)_2^-$), hexafluoroarsenate ($AsF_6^-$) and perchlorate ($ClO4^-$). Typically, the weight content of plasticizers in polymeric films for use as electrolytes may vary between about 20 to 80%, e.g., if the weight of the plasticizer used is 20 parts and weight of the polymer is 80 parts then that is considered as the plasticizer content of 20% as calculated below:

$$\frac{20(\text{plasticizer}) \times 100}{20(\text{plasticizer}) + 80(\text{polymer})}.$$

The above ratios only suggest the proportionality of the plasticizer and the polymer, and do not include weights of other additives such as salts, UV stabilizers. The type of polymers preferred for the ion-conductive materials are either single or multiphase thermoplastics. This is to impart enough structural strength to the layer and still have the chain flexibility to provide adequate ion conduction. For example, block thermoplastic polymers will provide multiphase structure where certain part of the polymer chain (hard segment) will form phases or domains which melt at high temperatures and are not solubilized by the plasticizer. An example of this will be thermoplastic polymers such as those formed by reacting an isocyanate monomer with another monomer containing reactive proton atoms, such as alcohols, phenols, amines and carboxyl groups—such as thermoplastic polyurethanes (TPU) formed by a reaction between isocyanate and alcohols. Polyurethane polymers may also include urea, allophanate, carbodiimide, uretidinedione, and other linkages in addition to urethane linkages. Other examples of block copolymers for electrolytic use are fluorinated polymers. Fluorinated polymers have regular repeat unit blocks in their polymeric chain structure which crystallize and hold the amorphous forming regions of the polymeric chains from slipping away. This plasticizer is mostly contained in the amorphous regions. For optical applications such as EC devices the size and concentration of the crystalline regions or that of domains formed by hard segments is small enough (generally less than about 400 nm, and in another embodiment less than about 100 nm) so that these are invisible and do not cause optical haziness.

The TPUs form hard and soft phases where the soft phases are compatible with the plasticizers and the hard phases hold the polymer shape (or act as physical crosslinks or binding points for the polymeric chains) in the temperature range of use, in other words the Tg of the hard phases is typically higher than the use temperature, in one embodiment Tg of theses phases is higher than 90° C. and in other embodiment higher than 100° C. and yet in another embodiment higher than 115° C. Since these electrolytes are thermoplastics and processed by lamination these hard phases should melt, and in one embodiment their melting point should be lower than 185° C., in another embodiment lower than 170° C. and in another embodiment lower than 150° C. The TPUs are formed by reacting a diisocyanate with two polyols (both with a functionality of two), one with a short molecular weight (or chain extender typically having a molecular weight of about 62 to 400) and the other a more flexible longer chain with a higher molecular weight (usually 600 to 3,500). These polyols react with the diisocyanate to form the TPU, and according to the theory blocks of predominantly diisocyanate and the chain extender form the hard phase while the reaction of predominantly diisocyanate and the flexible polyol forms the soft phase. Thus, the TPU is selected where the plasticizer has high compatibility with the flexible polyol. In addition, for those applications requiring good UV stability, such as window applications, aliphatic isocyanates are selected. A few commercial bifunctional aliphatic isocyanates are isophrone diisocyanate (IPDI), methylene-4-4'di(cyclohexane isocyanate) (HMDI) and hexamethylene diisocyanate (HDI). For applications where ions are present and redox activity takes place in electrodes in contact with the electrolyte film, it is preferred that the polyols used in the electrolytes are based on polyesters and polycarbonates, although in some situations polyether-based polyols may also be used. Polyesters include lactone based polyols such as those made using ring opening polymerization of γ-butyrolactone, γ-valerolactone, δ-valerolactone and ε-caprolactone. The polyols for soft segments themselves may be made not by using just one di-acid and one diol, but rather using one or more di-acids with one or more diols, so that these polyols themselves represent random copolymers including those which have branches (e.g., a polyol may be formed from adipic acid and using the following three diols in various proportions 1,6-hexanediol, 2,2-dimethyl-1,3-propanediol and 1,2-propanediol). This allows a greater flexibility in the finished urethane with the desired properties in terms of plasticizer compatibility, hardness, glass transition temperature and mechanical strength and toughness requirements of the urethane. As another example polyols for soft segments derived from lactones may contain more then one type of lactones, or even a mixture of lactones di-acids and diols, and may even have different molecular weights.

The preferred TPUs should be hydrophobic to minimize the water uptake in case electrolytic films containing these polymers are briefly subjected to ambient conditions during processing. A desirable moisture content ceiling in these films is about 0.1% by weight, and a lower number of 0.01% is preferred. In these thermoplastic films the NCO index is generally between 90 to 102 and in another embodiment between 95 to 100. NCO index is 100 times the ratio of the number (or moles) of isocyanate groups used to form the urethane as compared to the total number (or moles) of hydroxy groups present both in the flexible polyol and the chain extender. To promote good adhesion to substrates, thermoplastic polymers with slight excess of hydroxyl groups are sometimes used, i.e., the NCO index is lower than 100. The reactions to form these urethanes is carried out under stirring conditions and also the temperature is usually raised with increasing polymerization so that the mixture does not solidify before the reaction is completed. In one embodiment, during the polyurethane preparation the temperature is raised above the melting/flow point of the finished polymer.

In a variation of the above process, the chain extension diol is replaced by a diamine. Since the diamine and the isocyanate react faster (and form a polyurea bond) as compared to the isocyanate-hydroxyl reaction forming the urethane bond, this method forms a more uniform hard segment polymer chain sequences, largely comprising the chain extender and the isocyanate only, prior to the reaction with the soft segment forming polyols. In this case the NCO index is then defined by 100 times the total isocyanate groups divided by the total of the hydroxy and the amine groups. Thus the advantage of this method is the ability to carry out one pot synthesis, but having the advantages of a two-step reaction where in the first step only the isocyanate and the chain extender are mixed and reacted, and in the second step the soft segment forming polyol is added.

Further, to reduce the uptake of moisture during processing, part of the plasticizer content may also be hydrophobic. The plasticizer may be a mixture of different plasticizers and may include 5 to 80% of hydrophobic plasticizer by weight (based on the total plasticizer weight). When using hydrophilic plasticizers such as propylene carbonate, γ-butyrolactone, tetraglyme, sulfolane, monofluoroethylene carbonate, difluoroethylene carbonate, hydrophilic esters with molecular weights of less than 300, one may mix these with hydrophobic liquids, which may be hydrophobic esters and/or also hydrophobic ionic liquids. Aliphatic esters are preferred so that they have lower propensity to degrade in the UV. Some examples of such ionic liquids are salts of quarternary ammonium cations of pyridinium, pyrrolidinium, pyridazinium, pyrimidinium, pyrazinium, imidazolium, pyrazolium, thiazolium, oxazolium, and triazolium. These may have various substitutions or substituents, such as H, F, phenyl and alkyl groups with 1 to 15 carbon atoms. Rings may even be bridged. Saturated rings such as pyrrolidinium are preferred for superior UV stability for clear systems and they also tend to have superior electrochemical stability range. The anions of these salts are typically fluorine containing such as triflate ($CF_3SO_3^-$), imide ($N(CF_3SO_2)_2^-$), beti (($C_2F_5SO_2)_2N^-$), methide ($CF_3SO_2)_3C^-$), tetraflouroborate ($BF_4^-$), hexaflourophosphate ($PF_6^-$), hexafluoroantimonate ($SbF_6^-$), bis(fluorosulfonyl)imide ($N(FSO_2)_2^-$) and hexafluoroarsenate ($AsF_6^-$). Of these, imide, beti bis(fluorosulfonyl)imide and methide anions are able to provide hydrobhobicity. An example of a hydrophobic ionic liquid is 1-butyl-3-methyl pyrrolidinium bis(trifluoromethanesulfonyl)imide (BMP). When in an electrolyte ionic liquids and lithium salts are used, in some embodiments the anion for both are similar.

In addition, for window applications the plasticizers (or mixtures) are preferred which in one embodiment have a boiling point in excess of 50° C. as compared to the highest use temperature, and in excess of 100° C. in another embodiment. For example, the EC panels in the windows in the darkened state under sunny and intense solar conditions could reach temperatures of about 50° C. higher as compared to the outside ambient air temperatures. For example, a window used in climates where the outside air temperatures may get as high as in the vicinity of 45 to 50° C. with full sun, the window temperature in the darkened state can be close to 100° C., thus the minimum boiling point of the plasticizer (or of the mixed plasticizer) used should be 150° C. in one embodiment and 200° C. in another embodiment. Further these films (containing all ingredients including polymer and the plasticizers) should have a solidification point of the mobile phase (freezing point of the mobile phase or glass transition point of the complete electrolyte formulation) of at least the lowest use temperature it is subjected to, and in other embodiments at least 10 to 20° C. below the lowest use temperature. As an example, mobile phase is defined as the phase containing the soft segments and the plasticizer. For example, if in a region a window is subjected to −40° C. of ambient outdoor temperatures, then the solidification or the glass transition point of the mobile phase should be at least the same and, in some embodiments, even about 10° C. to 20° C. lower, i.e., −50° C. to −60° C. In many cases since electrolyte films will be incorporated into the device by lamination, it is important that the vapor pressure of the additives is low so that these do not outgas when vacuum is applied in the process to degas or deareate during lamination.

A method of making sheets of electrolytic TPU is to take the liquid plasticizer component and dissolve the UV stabilizer, the salt (lithium salt), adhesion promotors and viscosity modifiers. To these are added the polyols, and the polymer forming catalyst(s) so that a liquid mix is obtained and is then homogenized prior to the addition of the isocyanate. The isocyanate is then added and reacted with the polyol by heating this mix so that a solid electrolytic TPU melt is obtained. In one embodiment the UV stabilizer in the quantity added should be soluble in the plasticizer and the salt solution, and in another embodiment it must be soluble in the complete formulation which is being used to form the plasticized polymer. The weight fraction of the UV stabilizer is in the range of 0.1 to 10% of the total weight of the plasticized polymer (sheet). Any types of UV stabilizers and their mixtures may be used as long as they are compatible with the system, particularly soluble in the plasticizer and the salt solution. UV stabilizers include benzophenones, benzotrizoles, triazines, cyanoacrylates, hindered amines and non-basic hindered amines. Some examples of UV stabilizers useful in the current electrochromic devices are Uvinul 3000,™ Uvinul 3035™, Uvinul 3040™, Tinuvin 1130™, Tinuvin 292™, Tinuvin 765™, UVINUL D-50™, UVINUL D-49™, UVINUL 400™, TINUVIN P™ and Uvinul 3027™ all available from BASF (Wyandotte, Mich.). These UV stabilizers may be used by themselves in a particular device or several may be used together depending on the type of polymer and plasticizers used, wavelength coverage needed and electrochemical range of the device. In another embodiment the isocyanate and the polyol forming the hard segment (or the chain extender) is first reacted to form a prepolymer before adding the mixture containing the polyol for the soft segment. The latter may contain the other additives discussed above. The UV materials attenuate the UV light passing through the electrolyte sheet.

Various other additives may be incorporated into the thermoplastic urethane to impart particular properties. These include adhesion promoters, leveling agents, tackifiers which impart a tackiness to the resinous surface at moderately elevated temperatures (for example, at about 80° C.) viscosity modifiers and even dyes and colorants which impart permanent coloration in case it is required that the bleached state transmission of the EC devices is low or has a particular hue without having to adjust the same by selecting a substrate with a specific transmission or color. Examples of adhesion promoters include silanes such as glycidyl oxypropyl trimethoxy silane, gamma-aminopropyl triethoxy silane, 3,4-expoxycyclohexylethyl trimethoxy silane and amino trimethoxy silanes; leveling agents (e.g., cellulose esters) and tackifiers (e.g., phthalic acid type polyester resins). Examples of viscosity modifiers include fumed silicas, and for electrolytes hydrophobic silicas are preferred. Typical BET surface area of fumed silicas for use here is about 100 $m^2/g$ to about 300 $m^2/g$ (e.g., Aerosils R972, 974, R812 from Evonik (Parsippany, N.J.). When used, the additives should be present in amounts which do not adversely affect other desired properties of the thermoplastic polyurethane or the electrochromic properties (cyclability, degradation in weatherability, change in redox potentials, etc). Generally, these additives can be used in amounts within the following ranges, in parts by weight based on 100 parts of the thermoplastic polyurethane, about 0.1 to about 0.5 part of adhesion promoter; about 0.1 to about 2 parts of leveling agents; about 0.5 to about 5 parts of a tackifier; and about 0.1 to 2 parts of the viscosity modifier.

The plasticized polymer as obtained above is then processed into sheets by extrusion or calendaring, or plasticized polymer is cooled and pelletized so that these can be extruded later into films. These electrolytic sheets when formed should be immediately protected by release films and then rolled up and stored in sealed containers flushed with dry inert gas (nitrogen, argon, etc.) for transportation, and storage until used. This avoids excessive exposure to the ambient where it may take in excessive moisture and/or air. There may be variations of the sequence of addition of the polyols and isocyanates, i.e., one may first add the chain extender polyol followed by isocyanate and then the soft segment forming polyol. These materials may be made using either of the methods, however, a preferred method is where the compounding is done of the ingredients prior to the final polymerization step, i.e., before forming the TPU.

Further, in making the TPUs, the mole % of the polyol monomer providing the soft segment (based on the moles of isocyanates used) is usually in the range of about 30 to 70%, and the balance is the polyol providing the chain extender part. More than one soft segment and/or hard segment polyols may be used. Polyols containing sulfur may be used to increase the refractive index of the polymer so that it may be matched closer to the electrodes and substrates to keep optical reflections from the interfaces low. An example of a sulfur containing polyol for chain extender is 2,2'-[sulfanediylbis(benzene-1,4-diyloxy)]diethanol.

Another class of materials may be employed in making these prepolymers are ionomers, where the anion is part of the polymeric backbone and the cations are alkali metal ions (such $K^+$, $Na^+$ and $Li^+$). The formulations containing ionomers may still be mixed with the plasticizers and additional lithium salts to provide adequate ionic conductivity. One way of making an ionomer is to use polyols which have acid groups, but the latter do not participate in the reaction with the isocyanates while the prepolymers are formed. Later these prepolymers are reacted with strong bases such as lithium hydroxide to exchange the protons on the carboxylic acids with lithium. When weak carboxylic acids are used in the above process, their salts with lithium are quite prone to being moisture sensitive. In presence of water, lithium could be again replaced by protons raising the pH (due to the formation of LiOH) and reducing the lithium ion conductivity and causing electrochemical instability and irreversibility. Another alternative method is to start with salts of strong acids (such as sulfonic acids), as these are stable and do not interact with moisture to form bases. Salts such as 5-Sulfoisophthalic acid monolithium salt and dimethyl 5-sulfoisophthalate sodium salt are used. One mole of these salts are chain extended by using two moles of diols to form a larger monomer, catalysts such as dibutyltin oxide are used (e.g., in a concentration of 0.05 wt %). Any volatile biproducts are removed. The polyols used are preferably those which are used for the soft segments so that these may easily interact with the plasticizers and the additional salts if used to provide ionic conductivity. These are then used to replace all or part of the soft segment polyols which are then reacted with aliphatic diisocyanates and the chain extender polyols and the additives to form the thermoplastic TPUs as described above. When sodium salts are used to make the above polymers, then using a dialysis procedure these may be later exchanged with lithium ions (either after the formation of larger monomer or the complete polymer).

In a very different use of ionomers in these electrolytes, one may even use a sodium salt for making an ionomer which ends up in the hard segment and form strong ionic bonds, i.e., it is first chain extended using diol for hard segment which does not have any interaction (or low interaction) with the plasticizer. The objective here is to raise the softening or the melting point of hard domains so that the polymers may be used for windows which see elevated temperature for long periods of time. Generally, the thermoplastic urethanes with aliphatic isocyanates without ionomers may be used to about 85 to 90° C. for continuous use. Thus, this is a method to extend the use temperature of thermoplastic ionic polymer with aliphatic isocyanates so that it has a melting point (softening or the flow point) in excess of 90° C., 100° C. or in another embodiment in excess of 120° C. In another embodiment this temperature must be lower than about 170° C., so that the film may be laminated at temperatures less than about 200° C. This allows these polymers to sustain higher temperatures during use without the use of crosslinking. In this case sodium or even bivalent ions such as zinc may be used to form the high temperature usable ionomeric polymers. It must be noted that in this case the ionic conductivity is not through the hard domains formed of ionic materials, but the soft segments which are compatible with the plasticizer.

The thermoplastic TPU in the electrolyte sheet may also be crosslinked as these sheets are being processed into the EC devices. Polymerization to form the crosslinks uses a different mechanism during the lamination process. For example, crosslinking is by addition polymerization as compared to the formation of the TPU which is formed by condensation polymerization. The addition polymerization may be triggered at a different temperature or even by light depending on the type of addition polymerization catalyst and chemistry which is used.

One way of obtaining such TPUs, which are capable of going through this type of polymerization, is to incorporate polymerizable unsaturations in the TPU. This can be done by forming a TPU so that it is predominantly isocyanate terminated or has unreacted isocyanate groups hanging of the TPU polymer chains. These groups are further reacted with mono-polyols which have also have addition polymerizable groups (e.g., free radical, anionic or cationically polymerizable group) as described below. The TPUs with such reactive ends may be optionally mixed with more monomeric crosslinkers which also have unsaturated groups and polymerize with themselves and/or also with the unsaturated groups located in the TPU polymer chains. For this type of reaction, typical molecular weight of the TPU in the formulation is about 3,000 to 200,000. Since it is desired that such a system be produced in a sheet form so as to incorporate the electrolyte sheet by lamination and then crosslink, the molecular weight of the TPU will be more in the range of about 20,000 to 200,000, and in some applications from about 30,000 to 70,000. If the molecular weight of the TPU is low (more in the range of about 3,000 to 20,000) then one may make liquid formulations which solidify by addition polymerization without adding any removable solvent. The latter scheme is more useful for the formation of redox coatings and will be discussed in the next section.

TPU's with even higher UV stability for use as electrolytes may also be formed using fluorinated polyols (for use as soft segments) reacted with the aliphatic isocyanates as described above. The chain extenders may be the same or these may also be fluorinated diols. Examples of commercial fluorinated polyols for soft segments include Lumiflon™ materials available as solids or in solution form from AGC Chemical Americas (Exton, Pa.). Lumiflon™ materials are based on low molecular weight copolymers of fluoroethylene and vinyl ether (FEVE) chemistry, where largely the fluoroethylene and vinyl ether moieties alternate.

The TPU's with unsaturated polymerizable moeities can be made in the following manner. In the first step the diisocyanate, chain extender (a diol) and the flexible diol (all monomers) are first reacted so that the TPU is formed. In this step excess diisocyanate is used so that the TPU is terminated by the isocyanate groups. Alternatively, TPU is formed first using the usual ratios of diols and diisocyanate, and then additional diisocyanate is added in a following step so that all the TPU chains are end capped with the isocyanate groups. A person skilled in the art can do these calculations to get the starting molar ratios of the monomers and order of mixing. To isocyanate terminated TPU, this is added a compound that will react with the isocyanate and provide a polymerizable unsaturation. For example, one may add either a monofunctional hydroxy or amine compound (or another type of compound with reactive proton) comprising radically polymerizable unsaturation (or unsaturated groups such as vinyl groups). Some examples of such hydroxyl compounds are polyalkylene glycol or polyester glycol mono methacrylates, polyalkylene glycol or polyester glycol mono acrylates (e.g., see Ebecryl 117 from Allenx (Alphretta, Ga.)). This results in a TPU terminated with unsaturated ends which are able to polymerize by addition polymerization. As a reminder typically, the reaction between an isocyanate and the reactive proton containing monomer is considered a condensation reaction or condensation polymerization, whereas when the unsaturations at the end of the TPU are opened up to polymerize that type of reaction is called addition reaction or addition polymerization. Typically in a condensation reaction, two monomers react with each other and then two of the pre-reacted monomers further react and keep growing in that fashion. Further, in most condensation reactions, small molecules that are generally volatile are formed, which are removed (e.g., water, carbon dioxide, methanol, ethanol, etc., typically materials with a boiling point less than about 120 C). Formation of urethane by reacting isocyanate and a polyol is one of the few exceptions in condensation polymerization where no volatile material or removable material is formed, but the polymer chain growth is as described above. In addition polymerization, an active end is formed which keeps adding monomers by opening of rings or unsaturations nearby and no volatile or removable material is formed.

To tailor the desired strength, stiffness, elasticity and to extend the temperature range of use to higher temperatures, the dual cure type of mechanism may be employed which eventually ends in crosslinking. To the TPUs obtained above, reactive diluents may also be added to provide more stiffness and strength so that these electrolytes can be used at higher temperatures as compared to the purely thermoplastic electrolytes. Some examples of reactive diluents are acrylates and methacrylates such as, butanediol dimethacrylate, ethoxylated pentaerythritol tetraacrylate, hexanediol dimethacrylate, hexanediol diacrylate, lauryl methacrylate, 2-phenoxyethyl methacrylate and 2-phenoxyethyl acrylate.

These electrolytic sheets are typically preformed and contain TPU with reactive ends along with plasticizers, salts, viscosity control additives, tackifiers, levelling agents, UV stabilizers, adhesion promotors, reactive diluents and other electrolytic ingredients, catalysts or initiators to promote reactions of the unsaturated groups. These formulations may be liquid at room temperature or solid (thermoplastic) depending on the amount and the molecular weight of the TPU and also the loading of the viscosity modifiers, reactive diluents and other electrolytic ingredients. As discussed earlier, the liquid formulations at room temperature are more useful for redox coatings as discussed in the next section.

Depending on the nature of the catalysts/initiators selected for addition polymerization of the unsaturations, these may be polymerized using heat (thermal polymerization) or light (photo polymerization). The thermoplastic electrolytic formulations have a solidification point (or a flow point) in a range of about 100 to 140° C. so that their films can be formed and the unsaturations are not reacted. These films can be easily transported without losing their form, and release papers may be placed between the sheets or within the roll. However, the thermal catalyst and/or initiator is so designed that during lamination they reach a higher temperature to activate the addition polymerization and cause crosslinking. Alternatively, the catalyst may be a photocatalyst which is activated during lamination processing by subjecting the laminate to appropriate radiation. The advantage of pre-formed thermoplastic electrolyte sheets, which are crosslinkable during device assembly, is their ability to withstand higher temperatures during use in the device as discussed below. As discussed later, when such polymerization is conducted, then depending on the composition of the coatings/substrate it is in contact with, this may crosslink across the interface to form covalent bonds. Another advantage of such sheets is that they may flow at a lower temperature during processing, but since they will be crosslinked later, and they can withstand higher temperatures during use without losing their solid form. Devices containing such thermoplastic sheets may flow at temperatures as low as 60° C. and as high as 170° C. for processing prior to forming the crosslinks.

Another way of preparing polymers with reactive groups is by attaching those monomers which polymerize by ring opening, such as cationic polymerization (please note that this type of cationic polymerization is also included within the category of addition polymerization). As an example, after obtaining the thermoplastic prepolymer (or a polymer) with a unreacted isocyanates as described above, these can be reacted with materials that are monofunctional with respect to the reactive protons and have terminal rings (for example, Trimethylolpropane oxetane (TMPO) available from Perstorp Holding AB (Sweden) as Curalite™ OX). These rings are opened during polymerization. These may be further mixed with reactive diluents (e.g., cycloaliphatic epoxies) and chain transfer agents (polyols) and catalysts such as Lewis acids (e.g., Irgacure 270 from BASF, Germany) to create crosslinkable formulations which may be photopolymerized during lamination process. An attractive aspect of such materials is good adhesion to a variety of substrates.

Another way to use unsaturated or any other addition-type polymerizable moieties in the thermoplastic electrolytic composition is to take an approach similar to an interpenetrating network (IPN). To the electrolytic composition an acrylic, a methacrylic monomer or a ring opening polymerization or any other addition-type polymerization monomer is added as a plasticizer along with the appropriate catalyst such as a photoinitiator if this polymerization is to be activated by UV or light radiation.

For example, UVEKOL A and UVEKOL S15 from Allnex (Alpharetta, Ga.) are urethane acrylates which have a long wavelength UV photoinitiator already incorporated in them or the acrylates listed above. For use in aliphatic TPU matrices, it is desirable to use aliphatic urethanes terminated by acrylate (includes methacrylate groups). Some of the other exemplary urethane acrylates available from Allnex are: Ebecryl 1271, 230, 231, 284, 8405 and 8402. These may also be mixed amongst themselves and/or with lower viscosity reactive diluents to change the flow properties for processing and the properties of the final material. Some of the reactive diluents are 1,6-hexanediol diacrylate (HDDA) isobornyl acrylate (IBOA) trimethylolpropane triacrylate (TMPTA) trimethylolpropane triacrylate (TMPTA). The reactive diluents are usually added in about 0 to 50% by weight of the urethane acrylates listed above.

Typically, these materials may be present in a concentration range of about 2-25 phr by weight (parts per hundred) based on the thermoplastic polymer forming the lamination sheet. The polymerization reaction involving these groups is activated only after the electrolyte sheet is formed. In one embodiment it is activated after the polymer sheet is incorporated or being incorporated into the end-device. When the electrolyte is a polyurethane (including thermoplastic urethane) this monomer may be a urethane oligomer which is terminated at one or at both ends with an addition-type polymerizable group as discussed in previous paragraphs. The monomer may be branched and have more than two ends which are modified with these groups. In one embodiment, the urethane oligomer may be made using the same components as the thermoplastic polymer (e.g., the same aliphatic isocyanate and the polyol used for soft segments) so that it is compatible with the thermoplastic urethane, and then terminating them with the polymerizable groups. The molecular weight of this material may be any, but typically will be in a range of about 800 to 6000. Thus, when this addition polymerization is carried out, the newly formed polymer penetrates the polymer sheet it is present in. The addition polymer may form a linear, branched or a cross-linked structure. Since the original thermoplastic polymer sheet and the polymer formed by polymerizing this material penetrate each other on a molecular level and are entangled, these are termed as IPNs. As discussed in the EC electrodes and Counterelectrodes section below this type of system has many advantages, particularly when this concept is also used in the EC electrodes and the counterelectrodes along with their use in the electrolytes. Also, as discussed earlier this type of structures may also provide higher thermal stability and other property advantages.

The electrolyte sheets of this invention may also be reinforced by incorporating surface functionalized nanoparticles. The nanoparticles mainly comprise of inorganic materials such as metal oxides (including mixed metal oxides). These nanoparticles are not electronically conductive and may even be porous. Their incorporation helps in increasing the mechanical properties (increased strength and/or modulus) of the electrolyte film (or sheet) at a given temperature or increase its temperature performance where the sheet would be usable in devices at higher temperatures. Some of the oxides are of silicon, aluminum, zirconium, titanium, tantalum and mixtures containing one or more of these oxides. Since these sheets are clear, it is desirable that the size of the nanoparticles, their concentration, and their refractive index be such so that scattering of the light is minimized. For the avoidance of doubt, as used herein, the terms nanoparticles and surface modified (or surface functionalized) nanoparticles in electrolytes or sealants, additives such as fumed silica are not considered as such nanoparticles. While additives such as fumed silicas may be added to the nanoparticles and surface modified (or surface functionalized) nanoparticles to modify viscosity, thixotropicity or other properties along with the non-conductive nanoparticles (which may be surface modified), they are not considered nanoparticles and surface modified (or surface functionalized) nanoparticles. In one embodiment the desired size of the nanoparticles is less than about 100 nm, in another embodiment less than about 30 nm and in yet another embodiment greater than about 4 nm. In another embodiment, the concentration of the nanoparticles (by weight in the electrolyte sheet) is less than about 5%, in another embodiment less than about 1% and in another embodiment more than about 0.01%. In another embodiment the refractive index of the metal oxide use should be less than 2.5 and in another embodiment the refractive index of the oxide is less than 2, yet in another embodiment less than about 1.7 and in a further embodiment RI would be greater than 1.4. As an example, one may mix several metal oxides within a nanoparticle to obtain the desired refractive index. The strength of the film with nanoparticles at a given temperature may be increased by about 10% to 500% as compared to a film without these particles. Similarly, the increase in use temperature may be raised from about 5° C. to about 50° C.

These nanoparticles are surface functionalized (which means that their surfaces are modified by attaching organic polymers or monomers so that these nanoparticles are compatible with the polymeric matrix used in the electrolyte. These functionalization agents may be chemically bonded or physically attached to the nanoparticles. Further, these functionalization agents may by physically compatible with the polymeric matrix or may have groups which react with the polymer. For example, if the matrix of the electrolyte is a polyurethane, a similar polyurethane may be used for surface modification of the particles so that the particles are compatible and easy to disperse uniformly. The molecular weight of the surface functionalization agent may be greater than about 60 in one embodiment and greater than about 200 in another embodiment and greater than 2,000 in yet another embodiment the molecular weight of the functionalization agent is less than about 50,000. In another embodiment one may use a monomer with an isocyanate or a hydroxyl end group which could react with the polymeric matrix (i.e. with the hydroxyl group or the isocyanate of the polyurethane matrix respectively).

The nanoparticles may be added along with the other ingredients, i.e., along with the incorporation of the salt and the plasticizer, or these are added later. These nanopartricles may also be added prior to the polymerization reaction of the matrix polymer. In one embodiment all of the monomers (e.g., in case of polyurethanes—polyol, isocyanates, reaction promotion catalyst), plasticizer, the salt, UV stabilizer and the nanoparticles are added together and mixed and then the polymer is formed. Also, as disclosed above if this formulation contains the monomer for addition polymerization and the catalyst (such as photoinitiator) it is preferred that all of this is mixed in prior to polymerization i.e., the formation of polyurethane. This monomer must be compatible that is soluble in the formulation. After polymerization, the material is pelletized and formed (extruded or cast) into films or sheets. In another embodiment the nanoparticles are added to the electrolyte pellets, melt blended and then formed (extruded or cast) into sheets or films. These sheets and films are incorporated into the devices by lamination process. If these sheets have monomers which react by the addition polymerization, these may be activated by temperature/pressure being used lamination process and/or by subjecting the laminated device to a radiative source (e.g., UV) depending on the type of catalyst used.

Thermoplastic block copolymers may be used for electrolytic laminatable sheets. For example, block copolymers of polyvinylidene fluoride and fluorinated ethylene propylene may also be used for this purpose. Commercial examples of such polymers are e.g. Solef 21216, Solef 5130 both available from Solvay (Thorofare, N.J.)). These polymers may be made into electrolytic sheets for lamination by incorporating compatible plasticizers, UV stabilizers and lithium salts and other additives as discussed earlier within this section.

In many devices, the temperature of the devices may exceed 85° C. during operation, and thus TPU films need to withstand temperatures higher than 90° C. during use for long periods of time (several hours). In another embodiment the use temperature of the devices may be 100° C. or higher, particularly when colored to the dark state under very bright solar conditions where the outdoor temperature is also high. A desired processing temperature during lamination is between about 120 to 200° C. Thus, the ion-conductive materials should be able to flow between these temperatures while they are being integrated into the end products such as EC devices.

An important consideration during lamination process is deareating so that bubbles are not trapped. However, at the same time the plasticizer or other additives added to the electrolyte film or to any layer (see next section on EC electrodes and counterelectrodes) should not be degassed to an extent where this process will result in bubble formation from the loss of these materials which in addition may cause unpredictable or poor performance of the device. In order to avoid and/or reduce this the vapor pressure of these additives (unless they are bound in the film) should be lower than about 1 KPa or preferably lower than 0.05 KPa during the degassing part of the lamination process, and further the time for degassing needs to be optimized. As an example, during the lamination process, once the film is placed between the two substrates the degassing under reduced pressure (e.g., may be carried out at room temperature), and then the lamination press pressure is applied to clamp down on the film prior to heating the laminate to an elevated temperature to cause a partial melt of the electrolyte film and to bond properly to the substrate. Further the laminate may be cooled by about 20-70° C. or more (dependent on material properties and flow characteristics), prior to releasing the pressure. For most part, the reduced pressure used during degassing, should preferably be higher than the vapor pressure of the additive vapor pressure. For example, electrolytes and coatings containing propylene carbonate (PC) are preferably degassed at reduced pressures of 0.005 KPa or higher at 25° C., as the vapor pressure of PC at this temperature is about 0.003 KPa (Nasirzadeh, K., et al, J. of Chemical and Engineering Data, Vol 50(1) (2005) p 26-28).

EC Electrodes and Counterelectrodes

Both or any one of the electrodes, i.e., EC electrodes 4 or the counterelectrode 6, as shown in FIG. 1, may also comprise an electrolytic composition (i.e., ion-conductive composition) and at least one redox material. In addition, these redox layers should also have some electronic conductivity (unless the redox materials themselves provide electronic conductivity) to be able to exchange the electron with the conductive layers 3 and 7 and transport the electrons from/to the redox sites located throughout this layer. Since many UV stable organic redox materials are not electronically conductive, this property is introduced by adding inert particles which are electronically conductive. For clear windows it is preferred that these particles do not produce any haze or unobjectionable coloration. Thus at least one of their dimensions (diameter, length, width) should be less than about 100 nm, preferably less than about 20 nm. For batteries where there are no optical constraints one may use opaque graphites and other carbonaceous materials in high concentrations and/or larger sizes as long as they have the desired surface area or nanopores for the needed charge capacity. EC devices with the redox materials and the conductive particles are discussed in U.S. Pat. No. 8,593,714, published patent applications WO/2018/009645 and WO/2018/128906) and in U.S. Nonprovisional application Ser. No. 16/231,909 filed on Dec. 24, 2018, and Ser. No. 16/259,195 filed on Jan. 28, 2019; the contents of which are incorporated herein by reference in their entireties. The conductive particles should be electrochemically inert in the range of device operation, meaning these should not oxidize or reduce when the redox material in the device oxidizes or reduces. Some of these inert materials are electronically conductive metal oxides (e.g., indium-tin oxide, antimony-tin oxide) and carbon and graphite nanoparticles including carbon nanotubes, etc. When these materials are added in the layer, the metal oxide may not match the refractive index of the layer matrix and carbon nanoparticles may be dark, which may result in optical haze and reduction of optical transmission respectively. By limiting their concentration and/or their particle size, coatings with reduced or non-noticeable optical haze and high optical transparency may be obtained. However, the minimum concentration of the conductive nanoparticles should be above the percolation threshold. One may increase the concentration of the carbon particles much above the percolation threshold if devices need to be produced with lower bleached state transmission. In addition to the conductive nanoparticles the reinforcing nanoparticles (of non-conductive metal oxides, and preferably surface functionalized) as described earlier for electrolytes may also be used in this layer.

As discussed in more detail below, polymeric material used for the electrolyte may have a similar or a different composition compared to the polymer used in the redox layer. Similarities and differences are discussed in more detail below so that these layers should still be able to develop good adhesion and low resistance to the ion flow across their interfaces.

Figure 2:
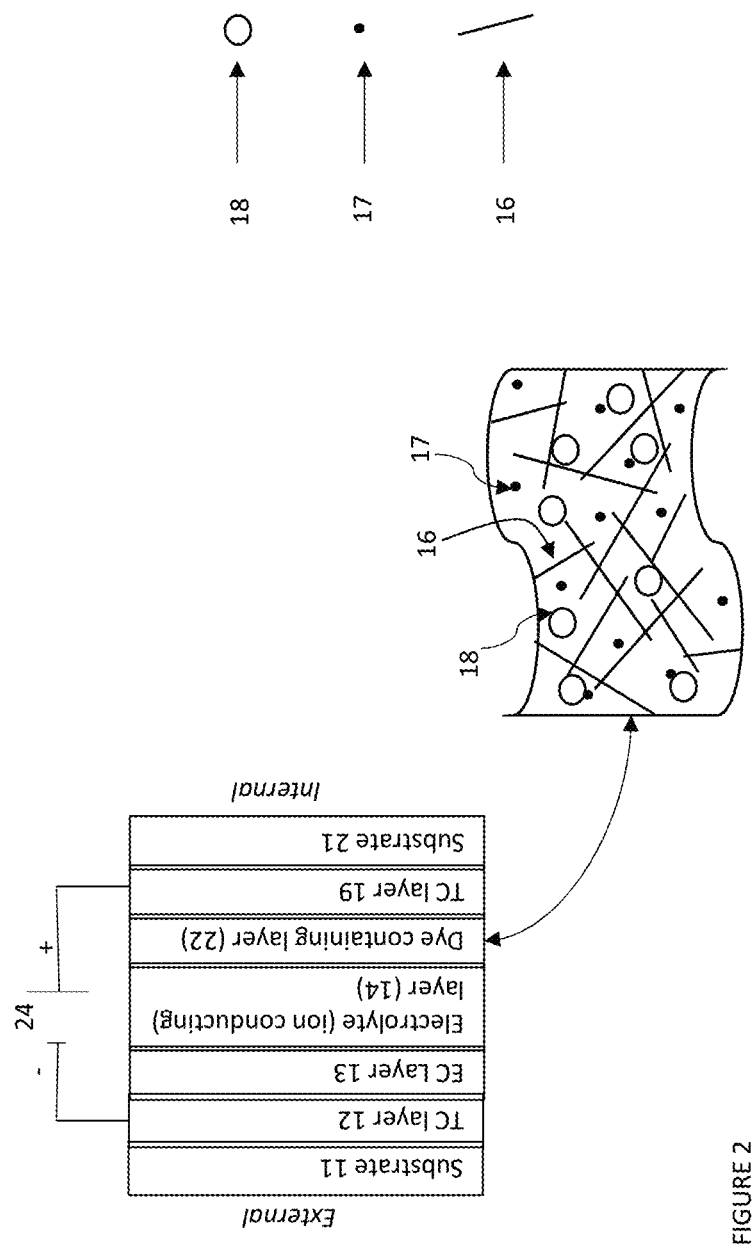
FIG. 2 illustrates a specific EC device according to some of the embodiments of the present invention.

An example of an EC device is shown in FIG. 2 where the electrochromic dye containing layer 22 is the redox counterelectrode held together with a polymeric binder. This layer has redox species as a redox dye 18, lithium salt 17 dissolved in this layer and conductive particles 16. This layer is solidified using a polymeric composition, i.e., this matrix polymer acts like a binder to keep all the components together. Typically, the redox material may be present as particulates (e.g., metal oxide particles with redox and/or electrochromic properties) which have adhesion towards the matrix or molecular species (e.g., an electrochromic dye) which is covalently bound to the matrix polymer and/or to the conductive particles or some other large species within this layer so that it does not migrate out of this layer. Generally, this layer also has a plasticizer which is able to dissolve the salt (e.g., lithium salt). In one embodiment, the plasticizer should also be capable of independently dissolving the redox material, so that it and the dissolved salt are able to interact readily within this layer.

FIG. 2 schematically shows a percolated network of electronically conductive particles 16 along with the dye molecules 18. The ion-conducting layer 14 (or electrolyte layer), is proximate the dye containing layer 22. The conductive particles 16 may be nanotubes, nanorods, nanodiscs, nanoparticles of any shape and so forth. The nanoparticles have at least one dimension which is less than 100 nm. In case the redox layer is a salt, then in one embodiment the salt is added as a separate species and is soluble in the polymer and/or the plasticizer, and in another embodiment its cation is tethered to the conductive particles or to the polymer network or some other larger particles. In another embodiment the anion of the dye (if the dye is a salt) should be similar to the anion of the lithium salt. For all devices for use in window applications, where electrochromic dyes are used as redox agents, the use of bridged dyes is preferred due to their superior UV stability. Bridged dyes are discussed below.

Another type of device is shown in FIG. 5, where two substrates 50*a* and 50*b* are coated with conductive layers 51*a* and 51*b* respectively. For a window device these substrates and the conductive coatings are transparent. A preformed electrolyte sheet is 52 which is laminated between these substrates to form the device. The electrolyte layer in addition to the other ingredients (polymer, plasticizer, salt, UV stabilizer, etc.), also contains one or more redox species. In one embodiment these redox species are bridged dyes (i.e., dyes having an electron acceptor and an electron donor attached covalently or ionically (e.g., charge transfer compound) in a single compound, and at least of the electron acceptor or the electron donor has electrochromic properties). This means that either the electron donor or the electron acceptor can be oxidized (anodic) or reduced (cathodic) and then their optical properties, e.g. color, changes. Both, the electron acceptor and the electron donor may be electrochromic. These dyes could have several anodic or cathodic groups tied together or have a combination of anodic and cathodic structures in the same molecule. For example, covalently bonded molecular combinations of ferrocene-viologen, phenazine-viologen and phenothiazine-viologen, phenothiazine-anthraquinone, Phenothiazine-cyano acrylic acid, etc., Published PCT application WO/2018/128906, U.S. Pat. Nos. 6,767,481; 6,519,072; 6,560,004 and 6,816,298 for more examples of these dyes and these publications are incorporated herein by reference in their entireties). The bridged dyes may have ionic character or may not have ionic character. Ionic character means that the dye has cationic or anionic group in the molecule which is charge compensated by anion(s) or cation(s) respectively. As an example, the dye may have a bipyridial cation (viologen or a cathodic EC dye) which is charge balanced by an electrochemically stable anion (see examples of such anions in this document where Li salts with such anions are discussed).

These dyes may be free to move in the electrolyte layer of FIG. 5, and when voltage is applied across the two conductive layers then these migrate to the respective electrodes and oxidize and reduce. These dyes may also be attached to the polymer matrix of the electrolyte, or only some of these are attached (e.g., 10-50 molar % are attached) and others are free to move in the layer. Incorporation of redox and/or dye species in the electrolyte layer imparts both electrolytic properties and electrochromic properties in a single laminatable layer. As described below these dyes may have reactive groups (e.g., hydroxyl) which may be attached to isocyanate monomers if used for forming the polymer matrix. The concentration of the bridged dye is typically in a range of about 0.02 to 0.5 M, based on the plasticizer concentration. When the bridged dyes with anions and salts (including ionic liquids) are present, then in one embodiment their anions should be the same as the anions of the other salts present in the electrolytic layer.

As discussed in more detail below, in one embodiment the plasticizer type and the salt type (even if the plasticizers and salts are mixture of several components) should be the same in the polymeric redox layer and in the electrolyte layer (e.g., in respective layers 22 and 14 in FIG. 2). This reduces the tendency for migration of these components from one layer to the other.

It is important that the salt and the plasticizer type in the electrolyte layer (layers 5 and 14 of FIGS. 1 and 2 respectively) and the redox layers (e.g., layers 6 and 22 in FIGS. 1 and 2 respectively) be the same. In addition, in one embodiment, these should be present in a quantity so that when these are in contact within the device, there is little tendency for these ingredients to migrate from one layer to the other and starve one of these layers of these ingredients and reduce the layer performance. In general, since the electrolyte layer is thicker this may have a larger impact on changing the concentration of these ingredients in the redox layer. In one embodiment, the plasticizer content in both layers should be such so that when these are put in contact with each other, a natural equilibrium is maintained so that there is no net migration of the plasticizer from one layer to the other. In addition, in another embodiment, when the polymeric compositions between the two layers are similar, the molar concentration of the salt based on the plasticizer in each layer should be about the same, so that salt concentration also remains in an equilibrium between these two contacting layers. In case UV stabilizers soluble in the plasticizers are added, then it is desirable that these are still present in the layers in an effective concentration after lamination. If these are added both in the electrolyte and in the redox layers, then in one embodiment their type and concentrations based on the plasticizer content would be similar in these layers.

The electrolyte layer 14 has to have good adhesion with the EC layer 13 and the Dye layer (i.e., the redox layer) 22 (e.g., in FIG. 2) or the conductive surface (see FIG. 5). In some embodiments, the EC layer comprises only of an inorganic electrochromic metal oxide or a mixture of various metal oxides, such as tungsten oxide or tungsten oxide containing lithium oxide and/or also containing nickel and vanadium oxides, etc. In such cases the electrolytic layer should have a high tackiness towards such layers and may have materials to promote good adhesion with metal oxides that are stable under the electrochemical performance range of the device and also stable towards UV and heat. In some cases, there may be an additional ion-conductive layer (not shown in FIG. 2) between the electrode 13 and the electrolyte layer 14 to promote one or several of the following features as long as it conducts the ions from the electrolyte to the EC layer. This layer may serve one or more of these several purposes, it may have better adhesion to both the EC layer and the electrolyte layer, lower ionic resistance at the interface and prevent undesirable reactions caused by UV radiation between the semiconductor metal oxide (EC oxide layer) and the electrolyte interface. This layer having lithium ion conductive properties is discussed extensively in the references listed earlier in this section.

In another embodiment the EC layer 13 may also comprise a polymeric electrolytic type of composition with a redox material and electronically conductive particles as is layer 22. In one embodiment, the polymer binder used in layers 13 and 22 should be compatible or be the same. The EC layer 13 would then have an EC dye that is complementary to the dye used in layer 22.

The electrolyte may comprise a thermoplastic polyurethane (TPU), and the polymer in the dye (or redox) containing layers may be a TPU or a crosslinked polyurethane. In order to provide similarity and good adhesion to all these layers, in one embodiment the chemistry of the plasticizer compatible polyol used in the soft segment of the electrolyte layer TPU should be the same or similar to the chemistry of one of the polyols used in the dye (redox) containing layer(s).

Similarity of polyol chemistry means that these polyols and the plasticizer (or in plasticizer with salt dissolved in it) in the unpolymerized state should be miscible. They could be chemically identical with the same molecular weight, or more generally compatible. In one embodiment compatible means that the polyols should be completely miscible with one another. In another embodiment the polyols should be completely miscible with the plasticizer and/or the plasticizer salt solution selected for the system. In yet another embodiment, the polyols in the plasticizer should have their solubilities within a factor of three (by weight) of each other, i.e., if one polyol has a solubility of 300 g of polyol/liter of plasticizer, then the other polyol should have a solubility between 100 to 900 g/liter of the plasticizer. In another embodiment compatibility means that the polyols should have their solubilities in the plasticizer or the plasticizer containing salt within a factor of 1.1 by weight of each other.

The dye containing redox layer may use an isocyanate with a functionality greater than two, preferably greater than 2.5 and more preferably greater than three and use a proton reactive monomer material compatible with the one used in the electrolyte. In a preferred embodiment the same diol as used as the one used for the soft segment in the electrolyte TPU layer. This layer after coating deposition would crosslink and form a solid. Some examples of aliphatic isocyanates with a functionality greater than three are available from Covestro Inc (Pittsburgh, Pa.) under the tradename Desmodour N.

The use of urethane chemistry (or in general use of isocyanates reacted with proton reactive compounds) for redox layer is highly versatile and can be adopted so that it is compatible with electrolyte chemistry. When electrolytes using fluorinated polymers are used in the devices, the active layer may also be made with such materials so that the compatibility (including adhesion) between the redox layer and the electrolyte is good. In this situation, fluorinated polyol for soft segment may be used (as a replacement for all or part of the regular hydrocarbon polyol in the formulation) for the dye containing redox layer in order to provide better compatibility with the electrolyte layer. Examples of commercial fluorinated polyols include Lumiflon™ materials. For solvent free coatings, solid polyols may be dissolved in a desired plasticizer or another polyol (e.g., chain extender which may or may not be fluorinated) and then the CNTs and other ingredients are incorporated.

A crosslinked redox layer with dye (redox agent) bonded to the polymeric matrix may be prepared as discussed below. The redox materials are synthesized with reactive proton groups (e.g., hydroxyl groups). This innovation is illustrated throughout on using those molecular redox agents (e.g., bridged dyes) which have only a monofunctional reactive group, however, that is not necessary, and redox agents with multiple reactive groups may also be used. When redox activity in the layer is provided by redox particles (e.g., of inorganic materials such as metal oxide, such as tungsten oxide nanoparticles) these may be surface functionalized (chemically reacted or physically attached) with compounds having pending reactive proton reactive groups such as hydroxyl groups.

In one embodiment the hydroxyl groups of the redox material (dye or other materials) is first reacted with the isocyanate that is then used for further polymerization for the formation of the polymeric network. In one embodiment the molar ratio of the isocyanate groups to the reactive hydroxy groups on the redox material should be selected so that after the reaction with the dye, the remaining (unreacted isocyanate groups) functionality of the isocyanate is still equal or greater than 2. When functionality of the isocyanate is 2, only linear polymer is formed, unless a polyol with a functionality of greater than 2 is used. In other embodiments this residual functionality of the isocyanates is greater than 2.5 and 3 respectively. This ensures that there are enough residual isocyanate groups which can still effectively participate in the urethane network formation. This pre-reacted isocyanate may be optionally mixed with unreacted isocyanate, and in that case the functionality can be calculated as a molar average, i.e., by using the following formula: $(M2*F2+M1*F1)/(M1+M2)$ where M2 are the moles of reacted isocyanate molecules and F2 is the residual (unreacted) isocyanate functionality of the reacted isocyanate, M1 are the moles of unreacted isocyanate molecules and F1 is the functionality of the unreacted isocyanate. This is then mixed with the polyol to make a coating formulation which is coated on the substrate and cured.

More specifically, a method to accomplish the above task to make a complete formulation for the redox layer with covalently attached redox species may be carried out as following:
(a) Mixture A is prepared by dissolving/mixing the lithium salt, ingredients such as UV stabilizers, adhesion promoting agents, flame retardants, colorants and solvents if used, etc., in the plasticizer
(b) Mixture B is prepared by mixing the isocyanate with the reactive dye and a reaction catalyst. The catalyst to promote the reaction between the isocyanate and the reactive group is added, this may be an organometallic catalyst such as dibutyltin dilaurate, or tin free catalysts such as K-KAT XK-614, K-KAT XK-604 from King Industries (Norwalk, Conn.). This mixture is reacted, if necessary heat may be used to promote this reaction. Even after the reaction a number of isocyanate groups are left which have not reacted as discussed earlier.
(c) Mixture C: Dispersing conductive nanoparticles in polyol
(d) Mixing the above components "A" and "C" and then adding component "B" to make the coating formulation.

To this viscosity control additive if used is also mixed with component A or is added to the final mixture, such as hydrophobic fumed silica as mentioned earlier. The coating formulation is deposited and cured. Curing is carried out in dry conditions and preferably under a blanket of inert gas (such as nitrogen, argon) at elevated temperature to speed up the process. Several modifications to this method and mixture sequences may be implemented.

As discussed for the electrolytic layer, the coating may also be modified so that it has groups and materials which can be polymerized or cured by radiation (e.g., microwave or optical radiation such as UV, visible light or IR radiation). If the purpose of the microwave and the IR radiation is only to increase the temperature, then the chemistry described in the earlier paragraph may be used and one may add additives which will absorb or increase the susceptibility for the desired infrared or the microwave wavelength more effectively. For photocuring, using UV or other optical or gamma radiation, the formulation may be modified so that first a compound or a non-crosslinked prepolymer is made by reacting the dye and the isocyanate where these compounds still have unreacted isocyanate groups. The isocyanate groups in the prepolymer are reacted with another compound which has both reactive protons and has a group with polymerizable unsaturation or rings which could be opened. Examples of such compounds with reactive proton hydroxy groups with unsaturations and polymerizable rings were discussed in the earlier section (e.g., glycol mono methacrylates and trimethylolpropane oxetane). To tailor the desired strength, stiffness, elasticity, extend the temperature range of use to higher temperatures and a reaction rate one may also optionally add reactive diluents to the above mixture as also discussed earlier. An advantage of photocuring is rapid processing speeds. When polymerizable rings are used, then as chain transfer agents dendrimer type polyols may be used for providing superior processability, viscosity management and properties of cured coatings. For example, dendritic polyols with different functionalities are also available from Perstrop under the tradename of Boltorn™.

For example, the dyes may be made with a reactive end such as an acrylic or a methacrylic end which may be cured into the matrix. As an example, UVEKOL™ and Ebecryl™ materials and reactive diluents discussed in the previous section may be used as the main polymer into which the conductive particles are dispersed. These are then mixed with the non-reactive plasticizers, salts, UV stabilizers, dyes with the reactive ends and appropriate photoinitiator (UVEKOL materials already come packaged with a photoinitiator) and then deposited on a the desired substrate and polymerized to form this layer.

In yet another novel approach, one may covalently bond the electrolyte layer to the redox containing layer. For example, the electrolytic TPU is made into a solid film which could be laminated but also has incorporated into its structure polymerizable groups (unsaturated groups or groups which polymerize cationically by ring opening) along with a catalyst (thermal or photocuring). Also, the redox layer is processed and solidified by polymerizing the isocyanate/polyol groups, however, the redox formulation also has polymerizable unsaturated groups along with a catalyst. This is similar in concept to B staging or by partial curing where only part of the system has polymerized. Once the device is assembled, i.e., the redox coatings are deposited and partially cured, and the partially cured electrolyte is laminated, the whole assembly is either subjected to a higher temperature or to photonic radiation (e.g., UV or light) where the polymerization of the unsaturated groups is initiated at the same time in all the layers. It is expected that monomers in each of the layers will polymerize providing additional strength and/or temperature resistance to these layers but also the monomers at the interface of the layers will polymerize and form covalent bonds linking the layers (i.e., the electrolyte layer and the redox layers). In order to promote interlayer polymerization the same monomers may be used in both layers or they may have a high reactivity with each other.

The above shows how the use of multiple polymerization mechanisms in a system may be used to first create the polymers in each of the layers (redox and the electrolyte layers) and then another polymerization system to create the bonds between different layers during device assembly. The multiple polymerization illustrated above involves a condensation (urethane formation) and an addition processes (ring opening or polymerization of a vinyl group), but one may use any two types of polymerization methods, e.g., both may even be condensation but involve different isocyanate/reactive proton reactions which may require different temperatures and perhaps different catalysts.

Another way to use unsaturated or any other addition-type polymerizable moieties in the coating composition is to take an approach similar to an interpenetrating network (IPN) as discussed earlier for the electrolytes. To a coating composition which could be solidified by removal of a solvent or thermally polymerized (first polymerization), an acrylic or a methacrylic monomer or any other addition-type polymerization monomer is added along with an appropriate catalyst, a photoinitiator if this reaction is to be carried out by radiation, such as UV. The polymerization reaction (second polymerization) involving these groups is activated only after the coating is deposited and the first polymerization has been done. In one embodiment second polymerization is activated after the coating is incorporated or being incorporated into the end-device. For example if the end device is made by laminating an electrolyte sheet, the second polymerization of these groups is activated after this step or during lamination. The coating may comprise of a thermally cured urethane formed by first polymerization and this monomer may be a urethane oligomer which has addition-type polymerizable group(s). In one embodiment, this urethane oligomer may be made using the same components as the coating polymer formed by first polymerization. For example, the same aliphatic isocyanate and/or the polyol used in first polymerization may also be used here. As a specific example this polyol may be taken and its ends are modified with the polymerizable groups so that it is compatible with the thermally cured urethane formed by first polymerization and does not phase separate. In any case the monomer for addition polymerization must be soluble with the other ingredients of the coating formulation prior to the coating formation. The molecular weight of this material may be any, but typically will be in a range of about 800 to 6000. Thus when this polymerization is carried out, the structure of the polymer in the thermally cured urethane (first polymerization) is penetrated by the polymer formed by addition polymerization (second polymerization). Since the original thermally cured polymer (or dried after removing the solvent) and the polymer formed by this polymerization penetrate or permeate each other on a molecular level and are entangled, these are termed as IPNs. Examples of the type of photopolymerized urethane acrylates and the reactive diluents if used are the same as provided in the electrolyte section (see for example, the products from Allnex). These may also be used in the a weight proportion of about 2 to 25 phr of the coating resin formed by first polymerization. This type of system has many advantages, particularly when this concept is also used in the electrolytes. In one embodiment the same monomer (or combinations) for second polymerization is used in both so that when the second polymerization is carried out in an assembled device, the network formed is across the interface of the electrolyte and the coating resulting in a high adhesion or a molecular stich across this interface. That is the redox layer has a composition (first composition) different from the composition of the electrolyte layer (second composition), however they are bonded together covalently by a polymeric material which permeates both of these layers, and in one embodiment this polymeric material is crosslinked (or is a network). In another embodiment this polymer is formed after the redox layer and the electrolyte layer have been formed and are in contact with each other. In yet another embodiment this polymer is formed by radiation polymerization (e.g., photo or UV initiated polymerization). This type of formation of interlayer covalent bonds may be used in devices where an electrolyte layer is embed between or laminatated between two adjacent redox layers, and all of the three layers are then stitched by forming this type of polymer network. The redox coating formulation may also have silanes with a acrylic/methacryic groups which may also polymerize with this network and also form a bond to the oxide based transparent conductor on which such coatings are deposited.

Multilayer Films and their Use

The polymerization mechanisms to crosslink thermoplastic polymers as described above may be used to another great advantage as will be discussed to process devices shown in FIG. 3. This figure illustrates EC devices according to some embodiments containing multilayer electrolytic compositions. This EC device has two opposing substrates 30a and 30b, which are respectively coated with TC layer 31a, 31b. In this case a pre-formed multilayer electrolyte film has three layers 32a, 32b, 32c. The layers 32a and 32c have redox materials incorporated, where at least one of these redox materials has electrochromic properties. For example, if layer 32a has cathodic EC dye then layer 32c will have an anodic material, which may also have complementary EC properties. Multilayer electrolytes may also comprise of two layers, where one of the redox layers, i.e., the EC layer or the counterelectrode is deposited on the substrate as explained in the earlier sections, and the remaining redox layer is formed as a layer on the electrolyte film.

The redox layer (e.g., a bridged dye) on the electrolyte film may have both anodic and cathodic properties as discussed earlier, but if the layer 32c is cathodic then only anodic part of the dye will be active. In one embodiment, use of bridged dyes is superior because of their enhanced UV stability.

As used herein, the phrase "complementary electrochromic properties" that it is desirable for an electrochromic device to include two electrochromic materials, with "complementary" electrochromic and electrochemical properties: That is, the first electrochromic material should undergo a colorless to colored transition oxidatively, while the second electrochromic material should undergo the same color transition reductively. Furthermore, the materials are electrochemically complementary so that one provides for a source and a sink of electrons within the same system, so that electrolytic decomposition of the solvent or the supporting electrolyte is prevented. In this way, one realizes double the optical effect per electron transferred, since two materials change color to a more highly colored (darker) state simultaneously. This "complementary counterelectrode" technology is, accordingly, the approach of choice. Preferred complementary electrodes are those which transition to the colored in different optical regions (i.e., have different colors or show color absorption peaks at different optical wavelengths which differ by at least 100 nm in one embodiment and by 200 nm in another embodiment. U.S. Pat. No. 5,189,549, is incorporated herein by reference.

Figure 3:
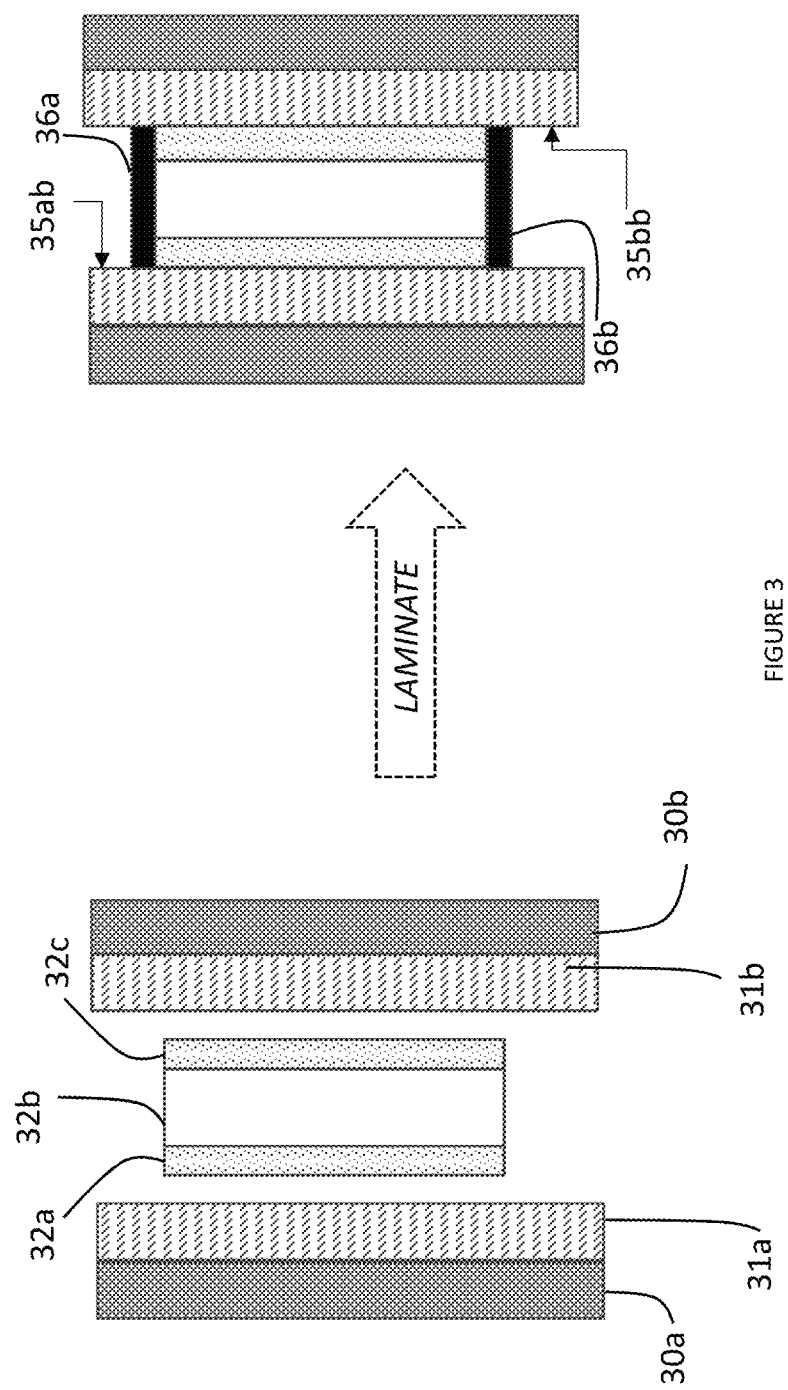
FIG. 3 illustrates schematics and formation of an EC window device, according to some of the embodiments of the present invention.

Continuing with FIG. 3, the central layer 32b does not have redox materials. The dyes or the electrochromic materials in the layers 32a and 32c are immobilized to reduce or eliminate their migration into layer 32b. In a system embodiment layers 32a and 32c contain conductive particles in a percolated concentration or higher.

The device (FIG. 3) is made by laminating the multilayer electrolyte and sealing the perimeter 36. The device is connected electrically by connecting electrical leads at the transparent conductor exposed at the perimeter as shown by 35ab and 35bb.

In one method, the multilayer film may be made using coextrusion, where all three layers are extruded simultaneously (e.g., see U.S. Pat. No. 8,115,984). The two outer layers comprise of the redox material and the conductive particles, where all three are made essentially using largely the same polymer (e.g., TPU which means using the same polyol monomers for the soft segments, even the hard segments) and the same plasticizer and the salt which may be present in similar concentrations. The isocyanate may be the same, but in the redox layers there is an added reactive component to ensure that the redox species is part of the polymeric network. However, in preparation of the polymer for the outer layers an additional diisocyanate is introduced which already has an attached redox agent. This type of diisocyanate is prepared by first taking an isocyanate with a functionality greater than 2, but any functionalities in excess of two are first pre-reacted with the dye (or the redox agent). Incorporation of this type of isocyanate-redox compound allows the redox material to be a part of the polymer so that it is covalently attached to the matrix.

In a further refinement, the dye and a diol are reacted to yield a modified diol as discussed below. Modified diol is prepared for example by reacting a dye with an isocyanate. However, after the reaction the dye reacted isocyanate molecule has a residual functionality of two. One mole of dye reacted isocyanate is then reacted with two moles of soft segment forming diol. So that a pre-polymer is formed where the dye will be in association with the soft segment of the final polymer. This allows dye to be predominantly in contact with the plasticizer and the salt. This modified diol along with any additional diols (the chain extender and additional soft segment diol if needed) is then reacted with the standard diisocyanate to form the TPU for this layer. As discussed in the electrolyte section, ionomers may be incorporated in hard segments wherein the latter provide increased thermal stability for continuous use.

In another variation the redox agents are synthesized with monofunctional isocyanate groups rather than the hydroxyl groups. In this case these may be reacted with a polyol with a functionality greater than two so that any hydroxyl functionalities in excess of two are reacted, which will then yield a diol which can then be incorporated in a TPU formulation by reacting with a diisocyanate and a chain extender.

All the TPUs in all the three layers (or the two layers, as the case may be) are further modified as explained in the earlier section to have polymerizable groups (such as unsaturations and ring opening groups). These may also be mixed with additional reactive diluents as discussed earlier. All these polymers are thermoplastics and may be extruded as a trilayer film as discussed above comprising layers 32a, 32b and 32c. As this film is incorporated in the device by lamination with the substrates with conductive coatings, the addition polymerization scheme is triggered (see previous section) so that superior covalent bonding occurs between the three layers and to the conductive coating on the substrates.

Perimeter Adhesives

Figure 4:
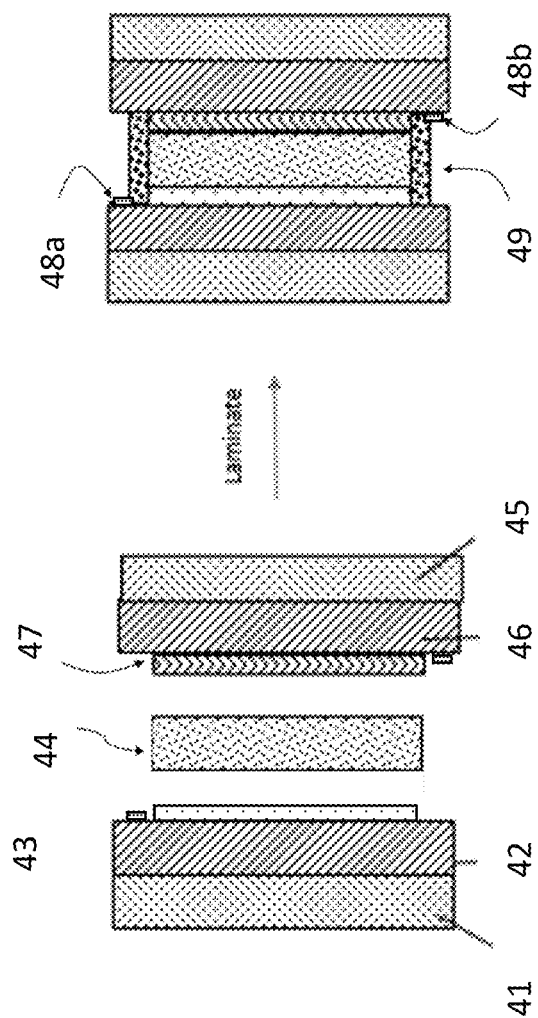
FIG. 4 illustrates an EC device and its construction according to some of the embodiments of the present invention.

Devices where a pre-formed film of an electrolyte is laminated between the substrates such as shown in FIG. 3 or shown as in FIG. 4 result in devices with a layer structure as shown in FIGS. 1 and 2. FIG. 5 also shows an EC device where the redox species are incorporated in the electrolyte layer. It is also essential that these devices are sealed at the perimeter so that the ambient elements such as moisture and oxygen in air does not interact with the redox electrodes and the electrolytes, i.e., these elements are sealed and protected from moisture and air/oxygen. The sealants are not shown in FIGS. 1 and 2, but it is intended that all such devices will be sealed at the perimeter, and the substrates protecting them in the planar regions.

The seal in FIG. 3 is shown as 36a and 36b, which is the same seal going all around the perimeter. In FIG. 4, the seal in the laminated device is shown as 49. FIG. 4 shows how to form the devices shown in FIGS. 1 and 2. The substrates 41 and 45 are coated respectively with conductive layers 42 and 46. For transparent window devices these are transparent conductors. Layer 43 is the EC layer and layer 47 is the counterelectrode where these are brought together by sandwiching the electrolyte 44. The edge busbars are 48a and 48b, to which the electrical connections are made. These busbars are only shown along one edge, but they may also be placed around the complete perimeter. These busbars are slightly or fully covered by the sealants in the encapsulated device after lamination. When conductive tapes are used as these busbars, they may extend past the substrate edge to which electrical connections could be made. The sealant also may be extended to the very edge of the substrates and flow and fill-in any voids between the busbar and the opposing substrate. In FIG. 3, perimeter busbars are not shown for simplicity, however, busbars are very important in devices to ensure fast kinetics (coloration and bleach speeds) and also to keep the optical change uniform while changing. In FIG. 5, the perimeter seals are shown as 56a to encapsulate the electrolyte from the edges. The busbars are attached to the conductive coatings on the substrates at 55ab and 55bb.

Busbars are conductors with low electrical resistance, made of conductive metal tapes, conductive metal containing frits (e.g., silver frits) and conductive adhesives with a surface conductivity of about 100 times or more as compared to the transparent conductors used. Typically, the surface resistance of the transparent conductors is in the range of about 1 to 50 ohms/square, and these busbars are in the range of about 0.00001 to 0.01 ohms/square to ensure minimum potential drop in them as they carry the current to the device. In order to assemble the device shown in FIG. 3 or 4, prior to lamination, busbars are placed on the perimeter of the substrates. These may be metallic tapes (e.g., Type 3007, 3011 from 3M company located in St. Paul, Minn.), conductive adhesives or silver frits (e.g., see Raj et al, Johnson Matthey Technol. Rev., 2017, 61, (2), 156). If tapes are used, these tapes have conductive adhesives so that current from the copper tape is transferred to the transparent conductor through the conductive adhesive. In the final device, the thickness of the electrolyte exceeds the thickness of the tape/busbar so that there is no hindrance in lamination or possibility of forming an electrical short between the two substrates. The busbar is spatially separated from the redox layers and the electrolyte by the perimeter adhesive. The perimeter adhesive may be squeezed and may also overlap the busbar completely or partially to provide additional electrical insulation so that there is reduced risk of developing a short between the two substrates. An insulating coating or a layer may be placed on top of the busbars to avoid any shorts with the opposing substrate, or the TC layer is removed from the opposing substrate.

For EC devices, the redox coatings are removed or not deposited in the perimeter region of the window area in a width of typically about 1 to 3 cm from the substrate edge. This region is used both for the perimeter sealant and the busbar. The busbars are located within this region close to the substrate edge either all around the perimeter or along at least one edge of the substrates (usually along the longer edge). The width of the busbar is about 0.2 to 1.5 cm and do not touch the redox layers or the electrolyte. This width along with the sealant has to be accommodated within the perimeter region (typically about 1 to 3 cm) designated for these components. Depending on the materials and the types of busbars used, their thickness varies between about 10 to 150 μm. An advantage of placing the busbar along one edge of the substrate or around the partial perimeter is that the busbars are not lined up on top of each other. This allows thicker busbars to be used (which provides higher conductivity), and if needed their width could be decreased to make the edge slimmer. Busbars placed all around the perimeter of the device have an advantage of applying power from all four sides of the window which increases the speed of transition (coloring and bleach speeds), however, since the busbars at the perimeter will stack up, their thickness combined should be lower than the electrolyte thickness. Further either the perimeter sealant or another non-conductive coating or a material needs to separate the two to avoid electrical shorts. To further increase the speed of transition internal busbars may also be used as described in U.S. Pat. No. 6,317,248, however that increases the cost of device fabrication.

To prepare the devices, the substrates are first coated with a TC. Depending on the materials used the edge busbar is applied prior to the redox (or EC) coating deposition or after these coatings are deposited. However, either the perimeter region where the busbar and the perimeter seal would be present, is either masked prior to the deposition of redox coatings or the coating process only coats the desired area avoiding this perimeter region or the coating is removed from this region after deposition. The electrolytic sheet is cut and placed on top of the redox layer of one of the substrates and its size is slightly smaller than the area occupied by the redox layer to allow for its expansion when squeeze pressure is applied during lamination so as to cover the entire redox coating area or leave a small perimeter region (like a ring) of the redox material that will be covered by the perimeter adhesive. The adhesive is dispensed as a hot melt, or as a viscous paste or applied as a tape to one of the substrates occupying the region between the redox layer and the busbar, and it may also overlap the busbar as long as the total thickness of the busbar and the adhesive on top of the busbar will not impose any edge delamination stress (i.e., the edges are not thicker as compared to the interior of the laminated window) and excess adhesive will flow out or is metered precisely for no overflow but come to the substrate outside edge.

During lamination the adhesive will also squeeze (i.e., spreads out or expands laterally), thus enough allowance should be given to accommodate this so as to form almost a seamless joint (no gap) between the adhesive and the electrolyte. The adhesive may even overlap the redox layer edges by a fraction of a mm or even by a few mm. During lamination vacuum is pulled to remove any trapped air and moisture or other volatiles before the two substrates are contacted or before the lamination pressure is applied. The electrolyte film and the adhesive film may have a surface texture to efficiently remove any trapped gases by applying a vacuum so that no bubbles are formed during lamination. As explained earlier, in applying this vacuum one has to consider the vapor pressure of any plasticizers in the electrolyte. After evacuation, pressure and heat is applied on the outside of the two substrate to form this laminate. Based on the size and geometry of the substrates, one can predetermine the expansion of the perimeter sealant and the electrolyte so that these are sized properly and just enough lateral gaps are left when these are placed so that these materials desirably form seamless edges at the designated boundaries after the lamination squeeze.

The adhesives (sealants) for perimeter sealing may also be formed using the reactive polymers which are crosslinked during device fabrication as was the case for some of the redox coatings and the electrolytes. The sealant may be dispensed as a liquid, e.g., hot melt where the polymer is still in a thermoplastic format, and after dispensing it is cured into a thermoset using a further polymerization reaction. This polymerization reaction occurs during lamination, triggered by a different temperature and/or pressure or even by radiation. The sealants do not have any plasticizers and lithium salt, and it is highly desirable that these be formed of polymer materials that are hydrophobic and have low oxygen and moisture permeability and are not compatible with the plasticizer found in the electrolyte or in the redox layer. In one embodiment the perimeter sealants have a thermal expansion coefficient which is similar to that of the electrolyte in the temperature range of use. Generally, this means that the average thermal coefficient in the range of −40 to 100° C. should be within 25% of the sealant and the electrolyte for most applications. In another embodiment, the glass transition temperature (Tg) of the soft segment of the polyurethane electrolyte (if used) should be similar to the soft segment of the sealant polyurethane, or at least the Tg of the sealant should be below the lowest use temperature.

The sealants are formed of materials with known low air and moisture permeability, such as polyisobutylene, polyacrylonitrile, polyvinylidene chloride, etc., which may also be optionally crosslinked during or after processing of the device. Sealants may also be formed using block copolymers, such as triblock copolymers where the central block is one of the low permeability polymers (e.g. polyisobutylene) and the end blocks are those materials which phase separate into domains and provide the mechanical properties (e.g. polystyrene, acrylic). The melting point (or the upper use temperature) of these materials is determined by these domains. The block length in these copolymers are is adjusted so that the volume occupied by the low permeable material exceeds 50%, and in another embodiment exceeds 70%, so that it forms the continuous phase with isolated discrete domains embed in the continuous phase.

The perimeter adhesive may be formed of a thermoplastic polymer having a reaction between isocyanate and a reactive proton monomer (e.g., polyurethanes and polyureas) with a reactive group as discussed earlier. The reactive groups include unsaturations and polymerizable rings) which may be used for polymerization after the adhesive is deposited as discussed in earlier sections. This polymerization typically results in crosslinking. For, example a TPU may be formed by reacting an isocyanate with a mixture of diols (a chain extender diol and a soft segment forming diol). Unlike in the electrolyte the soft segment forming diol should have none or little appetite to be soluble in the plasticizer or the solution of the plasticizer and the salt so that these sealants will have no tendency to absorb these and/or cause them to migrate outside. In addition, the perimeter adhesive may have a higher durometer hardness as compared to the electrolyte sheet so that it has high barrier properties and superior strength and structural properties. The solubility of these polyols (i.e., in the monomeric state) in the plasticizer at room temperature should be lower as compared to those used in the redox or the electrolyte layer or not be soluble in the plasticizer. A better way is to ascertain that the absorption of the plasticizer in the crosslinked polymeric sealant should be below 5% and, in another embodiment, below 1% and yet in another embodiment below 0.1% by weight. These may even be chosen from those hydrophobic diols which show low permeability to moisture and oxygen. In addition, since the sealant may be covered by a window frame, then these may be made using aromatic isocyanates and be of any color or opaqueness including black or dark colors. In one embodiment, the sealant should have superior thermal stability (and mechanical properties) as compared to the electrolyte in order to be able to provide good structural and barrier characteristics at temperatures exceeding at least 25° C. above the upper use temperature, and in some embodiments at least 50° C. above the upper use temperature. In some aspects, the melt or the flow temperature of the sealant should be at least 100° C., e.g., about 110-250° C., about 125 to about 175° C. Properties, such as higher durometer hardness, superior structural stability and lower permeability may also be imparted by having higher crosslinking density in the sealant (if crosslinked) as compared to the electrolyte and the redox layers.

Unconventional low permeability isocyanate cured sealants may be formed by using polyols or pre-polymers terminated by any proton reactive groups. For example, prepolymers comprising polyisobutylene, polyacrylonitrile, polyvinylidene chloride which are terminated with hydroxy groups may be used to form low permeability urethanes.

Generally, for conventional polyurethanes with equivalent properties but only varying the type of polyol chemistry, e.g., polyester polyols have lower gas permeability than polyethers and polycarbonate polyols. Thus, for conventional urethane sealants with low permeability polyester polyols are preferred. Since the polyester sealants have also lower hydrolytic stabilities, it is preferred to have a secondary sealant which may be selected from a variety of materials including silicones, butyls, polysulfides, etc.

In one embodiment, permeability may also be decreased by using additives which provide a torturous diffusion path. For example, nanoparticles with functionalized surfaces as discussed in the electrolyte section may be used here. Further, one may also use nanoparticles with a plate like structure which are more effective in providing a torturous path. An example of such inorganic additives are layered silicates or clays (e.g., montmorillonites) incorporated in an exfoliated state. These clays can be exfoliated using the matrix polymer and are also called organically modified layered silicates, e.g., these materials (e.g., Nanocor 1.30TC) are available from Nanocor (Arlington Heights, Ill.). These clays are introduced in a volume fraction of about 0.01 to 8% range, and in another embodiment in about 0.1 to about 4% range by weight of the sealant. There are two methods to incorporate the nanoclays in polyurethane sealants. In one method clays are added to the polyol (or the mixture of polyols) and mixed under high shear, so that the clays are exfoliated and intimately blended with the polyol, with polyol chains going between the layers of the exfoliated clay additive particles (this is an example of surface functionalizing the nanoclays). This mixture is then used to prepare the urethane adhesive by adding the desired isocyanate and the catalysts and conducting the polymerization after dispensing around the perimeter for thermosetting adhesives or preparing thermoplastic urethane tapes to be used for sealants. In another method the clay particles are introduced in a formed polymer (e.g., a thermoplastic urethane). In this method the polymer is dissolved in a solvent and mixed with the clay under high shear (unless the polymer is low in molecular weight and can be processed without a solvent). The solvent is removed and this mixture is then blended with urethane polymer, or the solution is first blended with a batch of thermoplastic urethane polymer and then the solvent is removed, so that the resulting material may be processed as above. The clay in thermoplastic urethane may also be added and exfoliated by melt blending (e.g., by using high shear such as twin-screw extruder compounding).

Windows Incorporating Electrochromic Elements

Windows incorporating EC elements such as in insulated glass units (IGUs) are discussed in published patent applications WO/2018/009645 WO/2018/128906, which are incorporated herein by reference in their entireties. However, as discussed below, improvements in IGU construction can lead to even higher performing windows from energy perspective. The EC elements discussed here may be those as discussed above in FIG. 1 through 5, or those produced differently. In the IGU units of this invention, other technologies where the glass tint is varied by electrical voltage may also substitute the EC element, for example using liquid crystal panels as those used in Eyrise™ s350 from Merck (Darmstadt, Germany). In addition to the IGU windows providing energy efficiency by modulating the transmission of solar radiation, it is also important that the IGU windows have low thermal conductivity properties i.e., high thermal resistance or higher "R" value (sometimes for thermal conductivity of glass, "U" value of glass is stated which is its thermal conductance or reciprocal of R value, i.e., R=I/U, and in that case U should be smaller for providing high thermal resistance). The IGU windows may be constructed by using an EC element with substrates of different optical properties, and also combined with another glass with different optical attributes giving rise to different SHGC range (discussed below) or different R value even when using the same type of EC element. The R values listed in this document have units of $[W/m^2K)]^{-1}$, to convert the R values to SI units $[BTU/h \cdot ° F \cdot ft^2)]^{-1}$, i.e., to $R_{SI}$ the following equation may be used, $R_{SI}=R \times 0.176$.

The Solar modulation of a window with an EC element is also an important parameter which defines its efficiency as measured using Solar Heat Gain Coefficient (SHGC), where SHGC is a dimensionless factor between 0 and 1. A value of 1 means that the window is transmitting all of the solar energy. Since EC panels have variable transmission, it is possible to have windows for buildings and other uses which have a variable SHGC depending on the tint state of the EC element.

Both the SHGC and R for a complete IGU window is not only dependent on the glass properties but also the framing, type of spacer material used to separate the various panes, etc. Thus, for the purpose of this invention the R and SHGC values of windows used are those which are measured or calculated at the center of the glass (or window), i.e., away from the frame. A highly energy efficient electrochromic IGU window will have a high R value and be constructed for a SHGC of 0.15 or lower (in another embodiment lower than about 0.1) when the EC element is in the darkest state. The increase in SHGC when the EC element is clear (or untinted) should be large. As discussed earlier the SHGC in the clear state should be greater by a factor of 3 or higher for some embodiments while in others it may be greater by a factor of 4 or higher, when compared to the SHGC in the fully tinted EC state.

Figure 6:
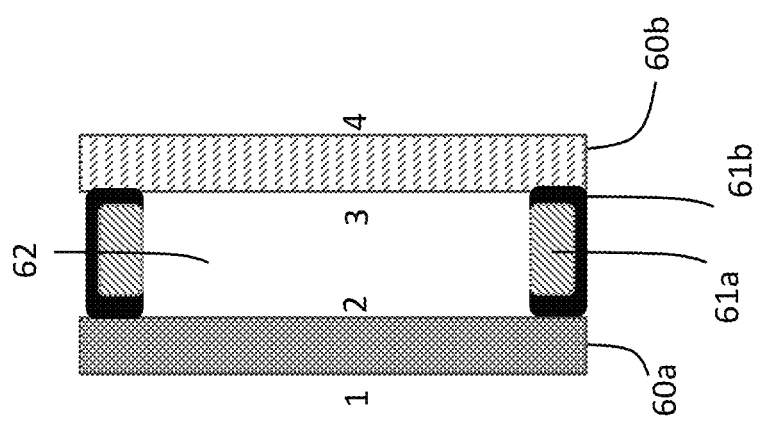
FIG. 6 illustrates an EC window in a double glass insulated glass unit (IGU) construction

An IGU window construction with an EC element is shown in FIG. 6. An EC element 60*a* is combined with a passive glass 60*b* to form the IGU. The spacer channel 61*a* and the adhesive 61*b* which run around the window perimeter is also shown. The spacer may be made out of metal or plastic or fiber reinforced plastic. The latter two provide superior thermal insulation. The space 62 between these two panels may be filled with a gas such as dry air or for better thermal performance with an insulating gas such as argon, krypton, $SF_6$, etc. Desiccants may also be added in the space and/or the adhesive to ensure there is no condensation of water vapor between the panes. Typically, the gap between the two panes is in the range of about 1 to 2 cm. The four surfaces of the IGU unit are marked with numbers 1 through 4. Where surface 1 faces outside and surface 4 faces the building interior. Surfaces 2 and 3 face inside the gap. To make the windows efficient from a SHGC and thermal impact one of the surfaces (2, 3 or 4) is coated with a low-e (low emissivity) coating (not shown). In all subsequent figures, i.e., FIGS. 7, 8 and 9, this surface numbering convention is used where surface 1 faces outside and the others are sequentially numbered. Please note that it is preferred that the EC element is located so that it is located facing outside of the building in order to maximize energy efficiency.

Typically, IGU windows with EC elements with a maximum SHGC in a range of about 0.25 to 0.55 are desired (i.e., the EC element is in the clearest state or is least tinted), and the lower range of SHGC is between 0.03 to 0.15 (i.e., the EC element is in the darkest or most tinted state). The range in the SHGC for a window in the clear state (and concomitant range in the most tinted state) arises due to the optical properties of the substrates used to make the EC panel, and/or the optical properties of the other glass used in the IGU construction (e.g., 60*b* in FIG. 6) and also the properties of the low-e coating. Since windows are building elements which connect inside to outside, there is always a desire to maximize visible light transmittance, but there are situations where low light transmission is needed for glare control, privacy and reduced energy use. Generally, the ratio of SGHC of a window with a variable light transmission element in its clear to dark state should be 23, and in another embodiment this should be 24. Typically, most conventional IGU constructions using double pane will have R values of about 2 to 4. The R values of these may be extended to about 5 by introducing extra spectrally selective coatings. The higher numbers are achieved by using insulating gases such as argon in the unit. In general walls of most homes will have R values of 15 and higher. This shows that a significant improvement in windows is needed to have good thermal insulation to be able to increase the overall building energy efficiency.

Figure 7:
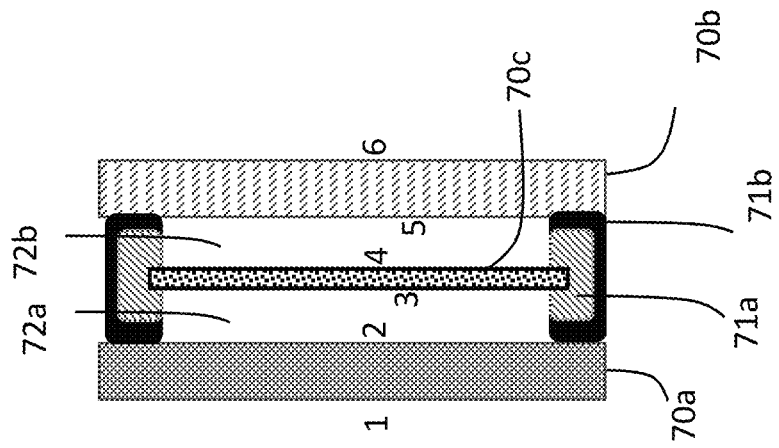
FIG. 7 illustrates an EC window in a triple glass IGU construction

Triple glazing is used to increase the R value. Typically, triple glazed units can increase the R value to up to 7 to 8, but it comes with a significant cost and increased weight of the glass. As shown for dual glazing in FIG. 6, the triple glaze unit has two sets of spacer channels parallel to each other separating the three panels and having two compartments. FIG. 7 shows a novel combination of EC with triple glazing. In this case the EC element is shown as 70*a* and is combined with another glass 70*b* to form an IGU. The spacer 71*a* accommodates another thin clear optical element (70*c*). Since there is an additional element the total number of surfaces are numbered from 1 to 6, where surfaces 3 and 4 are on the central element. To decrease the weight, the central element is thin, and could be made out of glass. Its thickness ranges from about 0.3 mm to about 2 mm, and in another embodiment from about 0.5 mm to 1.1 mm. The glass element 70*b* is generally thicker than 2 mm, more typically thicker than 3.2 mm. This has several advantages. First the increase in weight is negligible, second, the gap between the double glazing shown in FIG. 6 is simply divided in two chambers which does not result in increased window thickness as in a conventional triple glazing, where each chamber has a width of about 1 to 2 cm. Third, the chamber 72*a* and 72*b* are not sealed from each other, i.e., gas can leak from one chamber to the other, thus always equalizing the pressure in the two chambers due to differential heating effects. The element 72*c* is simply held in place by a slot in the spacer 71*a*. Any of the surfaces 2, 3, 4, 5 or 6 may have a low-e coating. Typically, surface 3 or 4 have a low-e coating. Optionally another low-e coating may also be placed on surfaces 5 or 6. In this construction spectrally selective reflective coatings may also be introduced on surface 1. Triple glazings with EC elements of this construction can achieve R values of 7 or more without the drawbacks of typical triple glaze constructions as mentioned above.

Figure 9:
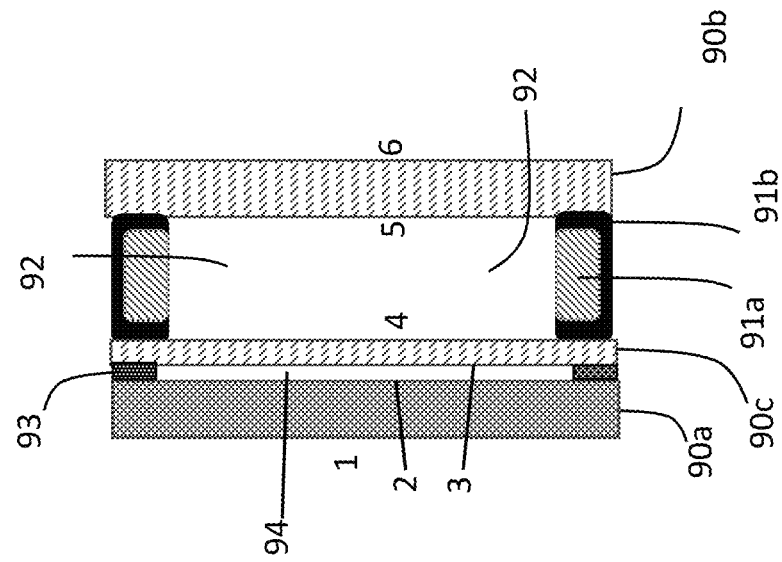
FIG. 9 illustrates an EC window in an IGU construction where the EC element is combined with a VIG glass.
Figure 8:
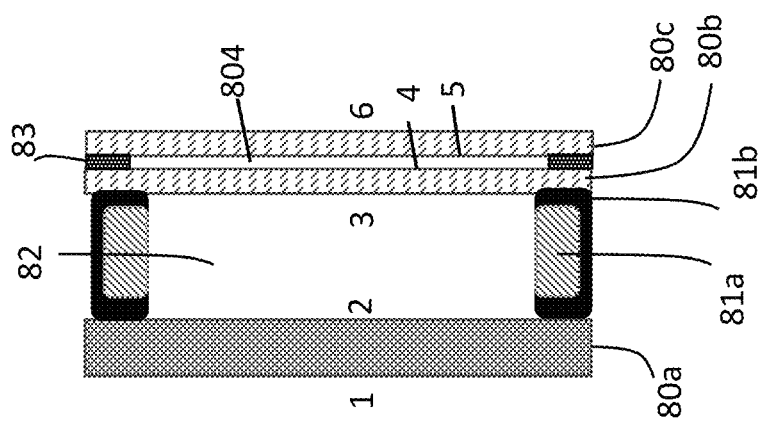
FIG. 8 illustrates an EC window in an IGU construction combined with a vacuum insulated glass (VIG).

One can further enhance the energy efficiency of glazing by incorporating a vacuum insulated glazing (VIG) with an EC element in an IGU construction. Along with the benefits of variable SHGC, R value of such glazing can exceed 10 and start approaching R15. FIGS. 8 and 9 show some of these concepts which are particularly useful for EC elements.

FIG. 8 shows an EC panel 80*a* which forms an IGU unit with a VIG element, wherein the VIG element is formed by glass 80*b* and 80*c*. the gap 82 is separated by a separator 81*a* and adhesive 81*b*. The panels in the VIG element (also referred to as a VIG unit) are separated by a small space 84, usually less than about 1 mm and this cavity is evacuated and sealed. The perimeter sealant for the VIG unit is shown by 83. So that the two pieces of glass 80*b* and 80*c* do not collapse from the outside air pressure, there are spacers (particles or walls) or pillars placed throughout this cavity (which are not shown) at a distance of about 1 cm to 6 cm grid pattern. The low-e coating may be placed on any of the surfaces numbered from 2 to 6. However, 3, 4 and 5 are most preferred. Surface 1 may have a spectrally selective reflective coating.

FIG. 9 shows another concept with VIG where the VIG element is formed using the EC element 90a and another piece of glass 90c separated by a small gap 94 as in FIG. 8 the small gap is evacuated and is sealed at the perimeter by using the sealant. The pillars and spacers in this gap are not shown. The IGU is formed using 90b which is separated from the EC+VIG element by gap 92 and is sealed by spacer and the adhesive 91a and 91b. Low-e coating may be on any of the surfaces from 2 to 6. The surfaces most preferred are 3 to 5. Spectrally selective reflective coating may be placed on surface 1.

There may be variations on the concepts presented in FIGS. 8 and 9. For example, a thin glass element may be placed in the gaps 82 and 92 as shown in FIG. 7 by 70c. Also glazing with high R value may be obtained by only combining 90a and 90c to form a thin VIG construction (integrated EC/VIG unit). Elements 91a, 91b and 90b are not used. In this low-e coating on any of the surfaces 2, 3 or 4, although a preferred surface is 3. For the purpose of this patent, the integrated VIG/EC construction will also be considered as an IGU construction as it has an insulative element due to the presence of VIG. To fabricate an integrated VIG/EC unit, it is desirable to fabricate a VIG unit first, where one of its outer surface is coated with a transparent conductive layer and then build the EC device (90a) using this conductive surface as one of the conductors.

Since EC windows tint to a dark state but still maintain visual clarity, one may combine EC elements with dynamic privacy elements, such as those which use liquid crystals so that windows can provide privacy at night when the interior of the buildings are brighter than outside. As an example, elements 60b, 70b and 90b in FIGS. 6, 7 and 9 respectively could be replaced by windows which reversibly switch from clear to opaque (hazy) by applying an electrical voltage (e.g., Eyrise™ i350 from Merck, Darmstadt, Germany). In these figures, one of the surfaces of the EC or the privacy element facing the gap may have a Low-E coating.

Beyond optical and thermal properties, use of laminated EC devices such as those described in this invention may also assist with lowering of sound transmission through the windows. Sound transmission through the windows is typically measured in a frequency range of about 100 to 5,000 Hz. Use of laminated EC device constructions could increase the sound transmission loss (or decrease sound transmission) by 2-10 dB in this range, where typically the larger increases are seen at the higher frequencies. The composition of the electrolyte layer in the EC device may be tuned so that it provides higher damping (tan δ) of the vibrations in this frequency range. The measurements for determining the sound dampening are carried out at about 25° C.

Many of the EC devices of this invention may be made using flexible polymeric substrates, so that these can be used for retrofit-window applications. For this the outside surface of one of the substrates is coated with an adhesive which is protected by a release layer. The adhesive layer and the substrate composition should protect other layers in the device from UV radiation. Typically, such films are bonded to the interior surface of a building window. At the time of application, the release layer is removed so that the EC device is bonded to an existing window. The film surface facing the inside of the building should have a low-E coating, with an emissivity of lower than about 0.4, e.g., as low as 0.1 and in another embodiment as low as 0.04. Optionally, the outside surface of the other substrate may be coated with a scratch resistant coating, and it is also desirable that this coating also has low-e properties to provide superior energy efficiency. For flexible EC devices which are bonded to the outside surface of the building window, the scratch resistant coating should not have low-e properties. The present disclosure includes the following any one of or any combination of any of items:

1. An electrochemical device, comprising:
a first substrate with a conductive coating;
a redox layer in contact with the conductive coating;
and an electrolyte layer comprising a first polymer wherein the electrolyte layer is in contact with the redox layer, the electrolyte and the redox layer both further comprising a plasticizer and a salt, wherein:
(iii) the electrolyte and the redox layer contain the same plasticizer; and
(iv) the concentration of dissociable salt based on plasticizer amount is similar in concentration in the redox layer and the electrolyte, and the redox layer further comprises (a) a second polymer material, (b) a redox agent and (c) electrically conductive particles.
2. The electrochemical device of item 1, wherein the device is selected from at least one of an electrochromic device and a battery.
3. The electrochemical of any one of or any combination of any of items 1-2, wherein where the electrically conductive particles are selected from the group consisting of graphene, single walled carbon nanotubes, double walled carbon nanotubes, multi-walled carbon nanotubes, conductive inorganic oxides, or a mixture thereof.
4. The electrochemical device of any one of or any combination of any of items 1-3, wherein the first polymer or the second polymer comprises at least one isocyanate compound reacted with a compound with a proton-reactive compound.
5. The electrochemical device of any one of or any combination of any of items 1-4, wherein the proton-reactive compound is a polyol or an amine.
6. The electrochromic device of any one of or any combination of any of items 1-5, wherein the redox agent is tethered to a polymeric component in the redox layer.
7. The electrochromic device of any one of or any combination of any of items 1-6, where the redox agent is a bridged dye.
8. The electrochromic device of any one of or any combination of any of items 1-7, wherein the redox layer and the electrolyte layer are bonded by a polymeric network which permeates both of the said layers.
9. An insulated glass unit (IGU) window which contains the electrochromic device of item 2.
10. An electrochromic device of any one of or any combination of any of items 1-9, wherein the same UV stabilizer is present in the redox layer and the electrolyte layer.
11. An electrochemical device, comprising:
an electrolyte layer comprising a first polymer and a first plasticizer wherein the electrolyte layer is in contact with a redox layer comprising a second polymer and a second plasticizer, wherein
(i) the first and the second plasticizers are the same; and
(ii) at least one monomer component of the first polymer and at least one monomer component of the second polymer are miscible with the first plasticizer and the second plasticizer.

12. The electrochemical device of item 11, wherein the first polymer comprises a polyurethane, polyurea, a fluorinated polymer, or a combination thereof.
13. The electrochemical device of any one of or any combination of any of items 1-12, wherein both the redox layer and the electrolyte layer have a further set of reactive groups which are activated to polymerize so that crosslinks are formed.
14. The electrochemical device of any one of or any combination of any of items 1-13, wherein the addition reactive groups are optically activated.
15. The electrochemical device of any one of or any combination of any of items 1-14, wherein the said device is electrochromic.
16. The electrochemical device of any one of or any combination of any of items 1-15, wherein at least one of the first polymer and the second polymer is selected from polyurethane and polyurea.
17. The electrochemical device of any one of or any combination of any of items 1-16, comprising a polymeric sealant comprising a crosslinked polymer and a reaction product of an isocyanate and a proton reactive compound, and the crosslinked polymer absorbs less than 5% of the first and second plasticizers, wherein the electrochemical device is sealed at its perimeter by said polymeric sealant.
18. The electrochemical device of any one of or any combination of any of items 1-17, comprising a polymeric sealant which comprises a polymer and an inorganic additive which reduces permeability of air and moisture through the polymeric sealant, wherein the electrochemical device is sealed at its perimeter by said polymeric sealant.
19. An electrochemical device comprising:
a first substrate with a conductive coating and a second substrate with a conductive coating;
a first redox layer in contact with the coating on the first substrate;
a second redox layer in contact with the conductive coating on the second substrate;
an electrolyte layer in contact with the first and second redox layers and sandwiched between the two substrates, wherein the electrolyte contains a plasticizer;
a sealant located at the perimeter of the device that seals the redox layers and the electrolyte from the environment, wherein the sealant comprises a thermoplastic polymer selected from at least one of polyurethane and polyurea which further contains crosslinkable groups capable of crosslinking by addition polymerization and the said plasticizer is not compatible with the thermoplastic polymer used for the sealant.
20. An electrochemical device of item 19, wherein a second sealant with a different composition with low permeability to moisture and air is used.
21. An electrochemical device of any one of or any combination of any of items 1-19, wherein the sealant comprises an inorganic additive, wherein the inorganic additive is capable of reducing permeability of air and moisture.
22. An electrochemical device comprising:
a) a redox layer comprising a first composition;
b) an electrolyte layer comprising a second composition wherein the said redox layer and the electrolyte layer are bonded together by a polymeric network which permeates both the said layers.
23. The electrochemical device of item 1-22, comprising polyurethane in at least one of the said redox and the electrolyte layer.
24. The electrochemical device in any one of or any combination of any of items 1-23, wherein the device is an electrochromic device.
25. The electrochromic device of any one of or any combination of any of items 1-24, wherein the polymeric network comprises radiation-polymerized polymers.

The present disclosure also includes the following any one of or any combination of any of items:
1. A method of making an ion-conductive polymer film for an electrochromic device, wherein the method comprises:
(a) mixing one or more monomers capable of forming a thermoplastic polymer, a plasticizer, a salt which is soluble in the plasticizer, a UV stabilizer, and a polymer-forming catalyst to form a mixture;
(b) polymerizing the mixture to obtain a formulation containing a thermoplastic polymer; and
(c) extruding or casting the formulation to form said ion-conductive film.
2. The method of item 1, wherein at least one of the salt, the UV stabilizer and the polymer-forming catalyst is dissolved in at least one of the plasticizer and a monomer prior to its mixing with other ingredients.
3. The method of any one of or any combination of any of items 1-2, wherein the polymerization reaction is selected from condensation and addition.
4. The method of any one of or any combination of any of items 1-3, wherein more than one plasticizer, polymer-forming catalyst, and UV stabilizer is included in the mixture.
5. The method of any one of or any combination of any of items 1-4, wherein the formulation may further contain at least one thermal stabilizer, colorant, processing aid, adhesion promotion agent, non-electronically conductive nanoparticle, or combination thereof.
6. The method of any one of or any combination of any of items 1-5, wherein the polymer is a homopolymer, random copolymer, block copolymer, or a graft polymer.
7. The method of any one of or any combination of any of items 1-6, wherein more than one monomer is used, and all monomers are added prior to the start of the polymerization reaction or some monomers are added at different stages of the polymerization step.
8. The method of any one of or any combination of any of items 1-7, wherein the polymer is selected from a fluoropolymer, polyurethane, polyvinyl butyral, acrylic, polyester, polyurea, polycarbonate, polyvinyl acetate, or a combination thereof.
9. The method as in any one of or any combination of any of items 1-8, wherein a solvent is added to the mixture, wherein such solvent is removed during step (c).
10. The method of any one of or any combination of any of items 1-9, wherein the plasticizer content is between 20 to 80% by weight of the total weight of the polymer and the plasticizer.
11. The method in any one of or any combination of any of items 1-10, wherein the salt content is between 0.05 to 2M based on the plasticizer content.
12. The method as in any one of or any combination of any of items 1-11, wherein the UV stabilizer is present in a concentration of 0.1 to 10% by weight of the polymer film.
13. The method of any one of or any combination of any of items 1-12, wherein the mixture prior to polymerization may contain at least one additional monomer which does not participate in the formation of the thermoplastic polymer, and which is polymerized after the polymer film has been formed.

14. The method of any one of or any combination of any of items 1-13, further comprising polymerizing the additional monomer by irradiating the polymer film after step (c).
15. The method of any one of or any combination of any of items 1-14, wherein the ion-conductive film is in contact on a first side with a first redox layer and in contact on a second side with a second redox layer such that the ion-conductive film exchanges ions with the first and second redox layers.
16. The method of any one of or any combination of any of items 1-15, wherein the ion-conductive film is constructed out of transparent polymers.
17. The method of any one of or any combination of any of items 1-16, wherein the ion-conductive film has a thickness that is between 100 microns and 1000 microns.
18. The method of any one of or any combination of any of items 1-17, wherein the thermoplastic polymer is a thermoplastic polyurethane made by reacting a diisocyanate monomer with a first polyol monomer and a second polyol monomer, each of the first and second polyols having a functionality of two, wherein the first polyol has a short molecular weight and wherein the second polyol has a longer chain with a higher molecular weight than the first polyol.
19. The method of any one of or any combination of any of items 1-18, wherein the second polyol has a molecular weight between 600 and 3500.
20. The method of any one of or any combination of any of items 1-19, wherein the first and the second polyols are polyester-polyols or polycarbonate-polyols.

The present disclosure also includes the following any one of or any combination of any of items:
1. A polymeric ion-conductive electrolyte sheet comprising:
i) thermoplastic polymer formed using at least three monomers;
ii) a melting point or a flow point in excess of about 90° C. and less than about 170° C.; and
iii) optical haze less than 5%.
2. The polymeric ion conductive sheet of item 1, having an ion-conductivity in a range of about $10^{-2}$ to $10^{-5}$ S per square cm of the sheet area when measured at 25° C.
3. The polymeric ion-conductive sheet of any one of or any combination of any of items 1-2, wherein the thermoplastic polymer is selected from a fluoropolymer, polyurethane, polyvinyl butyral, acrylic, polyester, polyurea, polycarbonate, polyvinyl acetate, or a combination thereof.
4. The polymeric ion conductive sheet of any one of or any combination of any of items 1-3, wherein the electrolyte sheet further comprises a plasticizer and a salt, wherein the salt can be solubilized by the said plasticizer.
5. The polymeric ion conductive sheet of any one of or any combination of any of items 1-4, wherein the said plasticizer solubilizes at least one monomer used to form the said thermoplastic polymer.
6. The polymeric ion conductive sheet of any one of or any combination of any of items 1-5, further comprising a UV stabilizer.
7. The polymeric ion conductive sheet of any one of or any combination of any of items 1-6, wherein the polymeric ion conductive sheet further comprises at least one of non-electronically conductive nanoparticles and surface modified non-electronically conductive nanoparticles.
8. The polymeric ion conductive sheet of any one of or any combination of any of items 1-7, wherein the polymeric ion conductive sheet contains at least one unreacted monomer which is not polymerized in said thermoplastic polymer.
9. The polymeric ion conductive sheet of any one of or any combination of any of items 1-8, wherein the polymeric ion conductive sheet contains a catalyst capable of polymerizing at least one additional monomer by radiation.
10. The polymeric ion conductive sheet of any one of or any combination of any of items 1-9, wherein the at least one unreacted monomer has cross-linkable groups.
11. The polymeric ion conductive sheet as in any one of or any combination of any of items 1-10, wherein the unreacted monomer is soluble in the plasticizer.
12. An electrochromic product comprising the polymeric ion conductive sheet of any one of or any combination of any of items 1-11.
13. A polymeric ion-conductive (electrolyte) sheet comprising:
i) a thermoplastic polymer; and
ii) a monomer,
wherein the said monomer is capable of polymerizing into a second polymer which is crosslinked.
14. The polymeric ion-conductive sheet of any one of or any combination of any of items 1-13, further comprising a plasticizer and a salt, wherein the said salt is soluble in the plasticizer.
15. The polymeric ion-conductive sheet of any one of or any combination of any of items 1-14, wherein the thermoplastic polymer is selected from a fluoropolymer, polyurethane, polyvinyl butyral, acrylic, polyester, polyurea, polycarbonate, polyvinyl acetate and a mixture of these polymers and the monomer is selected from at least one of acrylic, methacrylic and a ring opening monomer.
16. A polymeric ion-conductive (electrolyte) sheet comprising:
a thermoplastic polymer, wherein the thermoplastic polymer further comprises available polymerizable groups, and wherein the thermoplastic polymer has a melting point or a flow point in excess of about 60° C. and less than about 170° C.
17. The polymeric ion-conductive sheet of any one of or any combination of any of items 1-16, wherein the thermoplastic polymer comprises polyurethane, polyester, polyurea, polycarbonate, or a combination thereof.
18. The polymeric ion-conductive sheet of any one of or any combination of any of items 1-17, further comprising a plasticizer and a salt, wherein the said salt is soluble in the plasticizer.
19. The polymeric ion conductive sheet of any one of or any combination of any of items 1-18, wherein the polymerizable groups are polymerized by radiation.
20. A polymeric ion-conductive sheet comprising
i) a thermoplastic polymer selected from one of polyurethane, polyester, polyurea, polycarbonate, or a combination thereof and
ii) further comprising at least one of non-electronically conductive nanoparticles and surface modified non-electronically conductive nanoparticles, wherein the polymeric ion-conductive sheet has an optical haze of less than 5%.

The present disclosure also includes the following any one of or any combination of any of items:
1. A device comprising an electrochromic electrode layer and a counterelectrode layer sandwiching an electrolyte layer wherein a polymeric network permeates through the electrolyte layer and at least one of the electrochromic electrode and the counterelectrode.
2. The device of item 1, wherein the said polymeric network forms an interpenetrating network in at least one of the layers.
3. The device of any one of or any combination of any of items 1-2, wherein the said polymeric network permeates through a thermoplastic polymer in at least one of the layers.

4. The device of any one of or any combination of any of items 1-3, wherein the thermoplastic comprises fluoropolymer, polyurethane, polyvinyl butyral, acrylic, polyester, polyurea, polycarbonate, polyvinyl acetate, or a combination thereof.

5. The device of any one of or any combination of any of items 1-4, wherein at least one of the layers further contains a plasticizer and a salt, wherein the salt is soluble in the plasticizer.

6. The device of any one of or any combination of any of items 1-5, wherein at least one of the electrode and counterelectrode layers and the electrolyte layer contain a plasticizer and a salt, wherein the salt is soluble in the plasticizer.

7. The device of any one of or any combination of any of items 1-6, wherein the at least one of the electrode and counterelectrode layers and the electrolyte layer contain the same salt type and salt concentration in the plasticizer.

8. The device of any one of or any combination of any of items 1-7, wherein the counterelectrode has complementary electrochromic properties to the electrochromic electrode layer.

9. The device of any one of or any combination of any of items 1-8, wherein one of the electrochromic electrode and the counterelectrode comprises a metal oxide.

10. The device of any one of or any combination of any of items 1-9, wherein one of the electrochromic electrode and the counterelectrode comprises conductive particles.

11. The device of any one of or any combination of any of items 1-10, wherein the electrolyte layer and at least one of the electrochromic electrode layer and the counterelectrode layer (a) have a plasticizer along with a salt dissolved in the said plasticizer, and (b) the concentration of the dissolved salt in the plasticizer in the said layers differs by less than 10%.

12. The device of any one of or any combination of any of items 1-11, wherein the electrolyte layer and at least one of the electrochromic electrode layer and the counterelectrode layer comprise polymers, wherein (a) each of the said layers is made from a polymer which is a copolymer and (b) at least one of the monomers in these copolymers is the same.

13. The device of any one of or any combination of any of items 1-12, wherein the counterelectrode has complementary electrochromic properties in relationship to the electrochromic electrode layer.

14. The device of any one of or any combination of any of items 1-13, wherein one of the electrochromic electrode and the counterelectrode comprises a metal oxide.

15. The device of any one of or any combination of any of items 1-14, wherein one of the electrochromic electrode and the counterelectrode comprises electrically conductive particles.

16. The device of in any one of or any combination of any of items 1-15, wherein the polymer is selected from fluoropolymer, polyurethane, polyvinyl butyral, acrylic, polyester, polyurea, polycarbonate, polyvinyl acetate, or a combination thereof.

17. The device of any one of or any combination of any of items 1-16, wherein the counterelectrode has complementary electrochromic properties in relationship to the electrochromic electrode layer.

18. The device of any one of or any combination of any of items 1-17, wherein one of the electrochromic electrode and counterelectrode comprises a metal oxide.

19. The device of any one of or any combination of any of items 1-18, wherein one of the electrochromic electrode and the counterelectrode comprises electrically conductive particles.

The present disclosure also includes the following any one of or any combination of any of items:

1. A perimeter sealant for an electrochromic device comprising a melt processable block copolymer, wherein (a) a first phase of the block copolymer has lower permeability to air and water and (b) a second phase of the block copolymer determines its flow or melting point which is in excess of 100° C. and (c) the first phase has a volume fraction that is greater than that of the second phase.

2. The perimeter sealant of item 1, wherein the first phase is a homopolymer or a copolymer selected comprising isobutylene and isoprene, and the second phase is a homopolymer or a copolymer containing polystyrene and acrylic.

3. The perimeter sealant of any one of or any combination of any of items 1-2 wherein the electrochromic device contains a plasticizer, and the said plasticizer is not compatible with the said block copolymer.

4. The perimeter sealant of any one of or any combination of any of items 1-3, further comprising nanoparticles.

5. The perimeter sealant of any one of or any combination of any of items 1-4, wherein the nanoparticles are disc shaped.

6. The perimeter sealant of any one of or any combination of any of items 1-5, having an average thermal expansion coefficient of the sealant and the electrolyte is within 25% of each other in the range of −40° C. to 100° C.

7. A perimeter sealant for an electrochromic device comprising a melt processable polymer of at least one of polyurea and polyurethane having hard segments and soft segments and a higher volume fraction of the soft segments, wherein the perimeter sealant has a flow or melting point in excess of 100° C.

8. The perimeter sealant of any one of or any combination of any of items 1-7, wherein the melt processable polymer is a polymer of a monomer having at least one of isobutylene and isoprene groups.

9. The perimeter sealant of any one of or any combination of any of items 1-8, wherein the monomer has at least one of reactive hydroxyl and amine groups.

10. The perimeter sealant of any one of or any combination of any of items 1-9, further comprising nanoparticles.

11. The perimeter sealant of any one of or any combination of any of items 1-10, wherein the nanoparticles are disc shaped.

12. An electrochromic device comprising the perimeter sealant of any one of or any combination of any of items 1-11 and a plasticizer, wherein the plasticizer is not compatible with said melt processable polymer.

13. The electrochromic device of any one of or any combination of any of items 1-12, wherein the melt processable polymer is a polymer of a monomer having at least one of isobutylene and isoprene groups.

14. The electrochromic device of any one of or any combination of any of items 1-13, wherein the monomer has at least one of reactive hydroxyl and amine groups.

15. The electrochromic device of any one of or any combination of any of items 1-14, further comprising nanoparticles.

16. The electrochromic device of any one of or any combination of any of items 1-15, wherein the nanoparticles are disc shaped.

17. An electrochromic device comprising the perimeter sealant of any one of or any combination of any of items 1-16 and an electrolyte, wherein the average thermal expansion coefficient of the perimeter sealant and the electrolyte is within 25% of each other in the range of −40° C. to 100° C.

18. The electrochromic device of any one of or any combination of any of items 1-17, further comprising nanoparticles.
19. The electrochromic device of any one of or any combination of any of items 1-18, wherein the nanoparticles are disc shaped.
20. The electrochromic device of any one of or any combination of any of items 1-19, wherein the melt processable polymer is a polymer of a monomer having at least one of isobutylene and isoprene groups.

The present disclosure also includes the following any one of or any combination of any of items:
1. An insulated glass unit (IGU) comprising an electrochromic (EC) element which is (a) capable of reversibly varying the Solar Heat Gain Coefficient (SHGC) of the said IGU from about a range between 0.25 and 0.55 down to a range between 0.03 and 0.15 and (b) has a low-emissivity (Low-E) coating and (c) the said IGU has a thermal resistance (R value) of greater than 5.
2. The IGU of item 1, wherein the IGU contains a vacuum insulated glass (VIG) element.
3. The IGU of any one of or any combination of any of items 1-2, wherein the VIG unit comprises the EC element in a combination with a second glass element and spacers and vacuum therebetween.
4. The IGU of any one of or any combination of any of items 1-3, wherein one of the surfaces of the second glass element is coated with a Low-E coating.
5. The IGU of any one of or any combination of any of items 1-4, wherein at least one space between the glass elements is filled by argon, krypton, $SF_6$, or a combination thereof.
6. The IGU of any one of or any combination of any of items 1-5, further comprising a privacy glass element capable of reversibly changing its optical state from clear to opaque due to application of an electrical voltage.
7. The IGU of any one of or any combination of any of items 1-6, wherein the privacy glass element comprises liquid crystalline material.
8. The IGU of any one of or any combination of any of items 1-7, wherein the privacy element comprises flexible substrates and is bonded to a glass substrate or laminated between a pair of glass substrates.
9. The IGU of any one of or any combination of any of items 1-8, comprising at least 2 additional glass elements in addition to the said EC element, wherein the glass elements are separated by a gap filled with a gas.
10. The IGU of any one of or any combination of any of items 1-9, wherein one of the 2 additional glass elements have a thickness between 0.3 mm and 2 mm, and the other of the 2 additional glass element has a thickness greater than 2 mm.
11. The IGU of any one of or any combination of any of items 1-10, wherein a space between the EC element and the thicker glass element is divided by the thinner glass element inserted therebetween.
12. The IGU of any one of or any combination of any of items 1-11, wherein spaces between the EC element and the thinner and thicker glass elements are not sealed from each other.
13. The IGU of any one of or any combination of any of items 1-12, wherein at least one of the surfaces of the thicker and the thinner glass elements have a low-emissivity coating.
14. The IGU of any one of or any combination of any of items 1-13, wherein the EC element is formed using flexible substrates and is bonded to a glass substrate or is laminated between a pair of glass substrates.
15. An insulated glass unit (IGU) comprising a glass electrochromic element and (a) a privacy glass element capable of reversibly changing its optical state from clear to opaque due to application of an electrical voltage, (b) has at least one glass surface having a low-emissivity (Low-E) coating, and (c) has a thermal resistance (R value) of greater than 5.
16. An insulated glass unit (IGU) comprising an electrochromic (EC) element which is (a) capable of reversibly varying the Solar Heat Gain Coefficient (SHGC) of the said window from about a range between 0.25 and 0.55 down to a range between 0.03 and 0.15 and (b) a VIG element and (c) the said IGU has a thermal resistance (R value) of greater than 5.
17. The IGU of any one of or any combination of any of items 1-16, wherein the EC element and the VIG element are separated by a gap filled with a gas.
18. The IGU of any one of or any combination of any of items 1-17, wherein a surface of the VIG element facing said gap comprises a low-E coating.
19. The IGU of any one of or any combination of any of items 1-18, wherein at least one of the surfaces VIG element comprises a low-E coating.

The present disclosure also includes the following any one of or any combination of any of items:
1. A method of forming an electrochromic device, comprising:
providing a first coated substrate;
providing a second coated substrate; and
laminating a pre-formed polymeric electrolyte sheet between the first and second coated substrates, which wherein the pre-formed polymeric electrolyte sheet comprises at least one polymer, at least one plasticizer and at least one electrochromic bridged dye, which are dispersed throughout the sheet.
2. The method of item 1, where the polymer is polyurethane.
3. The method of any one of or any combination of any of items 1-2, where the dye is covalently attached to the polymer.
4. The method of any one of or any combination of any of items 1-3, wherein at least one polymeric redox layer is coated on at least one of the substrates.
5. The method of any one of or any combination of any of items 1-4, further comprising applying a perimeter sealant to the electrochromic device to seal the redox layers and the electrolyte from the environment, wherein the perimeter sealant comprises a thermoplastic polymer and a reaction produced of an isocyanate compound and a reactive proton compound, and the perimeter sealant further contains cross-linkable groups.
6. The method of any one of or any combination of any of items 1-5, comprising forming the perimeter sealant using a thermoplastic polymer by reacting an isocyanate compound with a reactive proton compound, and wherein the perimeter sealant is capable of further crosslinking.
7. The method of any one of or any combination of any of items 1-6, wherein the perimeter sealant is not miscible with the plasticizer.
8. The method of any one of or any combination of any of items 1-7, further comprising incorporating groups in monomers forming the thermoplastic polymer that are polymerized by addition polymerization.
9. The method of any one of or any combination of any of items 1-8, further comprising crosslinking the applied perimeter sealant using addition polymerization.
10. The method of any one of or any combination of any of items 1-9, further comprising adding an inorganic additive to the perimeter sealant, thereby reducing permeability of air and moisture through the sealant and reducing migration of components out from within the device.

11. A method of making an electrochemical device, wherein the electrochemical device comprises an electrolyte layer comprising a first polymer and a first plasticizer wherein the electrolyte layer is in contact with a redox layer comprising a second polymer and a second plasticizer, wherein
(i) the first and the second plasticizers are the same; and
(ii) at least one monomer component of the first polymer and at least one monomer component of the second polymer are miscible with the first plasticizer and the second plasticizer, the method comprising:
providing a first coated substrate;
providing a second coated substrate;
applying an electrolyte composition between the first and second coated substrates; laminating the electrolyte layer between the first and second coated substrates; and activating reactive groups on either the first polymer or the second polymer; polymerizing at least one monomer component of the first polymer and at least one monomer component of the second polymer.

12. The method of item 11, wherein the activating step activating the reactive groups by radiation.

EXAMPLES

Example 1: Electrochromic Device Containing a Tungsten Oxide Electrode and a Dye Containing Solid Electrode Separated by an Electrolyte Layer Preparation of Dye Containing Layer
List of Materials

| Material | Comments | Supplier |
|---|---|---|
| Isocyanate Desmodur N3800 | Aliphatic isocyanate with a functionality of 3.8 | Covestro LLC Pittsburgh PA |
| Propylene Carbonate | Anhydrous | Sigma Aldrich Chemical Company Milwaukee, WI |
| Lithium bis(trifluoromethanesulfonyl)imide | Anhydrous salt | Sigma Aldrich Chemical Company Milwaukee, WI |
| α-Methylferrocene methanol | 97% | Sigma Aldrich Chemical Company Milwaukee, WI |
| Carbon Nanotubes | Few walled. Diameter 2.5 to 3 nm Length 2.6 μm | Sigma Aldrich Chemical Company Milwaukee, WI |
| Diol Desmophen C1100 | Linear aliphatic polycarbonate polyester | Covestro LLC Pittsburgh PA |
| Dibutyltin Dilaurate Catalysts | Liquid catalysts | Sigma Aldrich Chemical Company Milwaukee, WI |

Isocyanate Monomer Formulation with Dye:

To a reaction vessel under nitrogen and fitted with a stir bar was added 0.840 g of isocyanate N3800 and 0.101 g of α-methylferrocene methanol (anodic dye). This mixture was stirred overnight to form a clear viscous yellow solution to react the two. To this was added 0.805 g of a solution of 0.2M Lithium bis(trifluoromethanesulfonyl)imide in propylene carbonate. The mixture was stirred for 30 minutes.

Diol Monomer Formulation:

Few walled electrically conductive carbon nanotubes were added to the diol C1100 to give a concentration of 0.1 wt %. These carbon nanotubes were dispersed in the diol by a three roll mill process where the minimum gap between the rollers was 5 μm. To this dispersion was added the catalysts dibutyltin dilaurate to give a final concentration of catalysts based on total resin (N3800+C1100) of 0.01 wt %. This mixture was stirred for one hour to form a black viscous liquid.

Coating Resin Formulation with Dye:

1.106 g of the diol monomer formulation was added to 1.746 g of the isocyanate monomer formulation and stirred by hand for five minutes. The mixture was degassed under vacuum for ten minutes to form the dye layer coating solution.

Dye Coating Deposition and Curing:

The dye layer coating solution was deposited onto pre-cleaned ITO (15 Ω/sq.) using a Mayer rod. The rod wire spacing was such to provide a gap of 33 μm. The deposited coating was cured at 65° C. for 15 minutes under ambient atmosphere. The thickness of the cured coating was 19 μm and was transparent with a slight green tint. The cured coating contained 28.3 wt % of the plasticizer propylene carbonate.

Device Preparation and characterization:

The dye layer on ITO was made into an electrochromic window by assembling this with another substrate which had an ITO coating followed by a doped tungsten oxide coating, as the counter electrode. The thickness of the $WO_3$ layer was 320 nm. The two substrates were positioned with the coatings facing each other in a parallel configuration a a distance (or gap) of 225 μm. The gap was filled with electrolyte composed of 0.2M lithium bis(trifluoromethanesulfonyl) imide in propylene carbonate and the perimeter was sealed. At 550 nm the cell had an optical transmission of 70% and when colored at 1.3V (tungsten oxide being negative) for 330 seconds a transmission of 21%. Applying a reverse potential of IV (i.e., reversing the polarity) the cell bleached back to 70% T in 262 seconds. In the colored state the cell was a deep blue color.

Example 2: Electrochromic Device Containing a Tungsten Oxide Electrode and a Dye Containing Solid Electrode Separated by a Laminated Polymeric Electrolyte Layer A solid thermoplastic urethane film was cast from the solution as follows. 6.72 g thermoplastic polyurethane PUL446-107 (obtained from Huntsman Corporation, Woodlands, Tex.) was dissolved in 70 ml of tetrahydrofuran (THF), to this was added two plasticizers 1.568 ml (2.2 g) of 1 butyl 1 methyl pyrrodolinium bis 9trifluoro methyl sulfonyl imide), and 6.272 ml of propylene carbonate (7.46 g) and 2 g of lithium trifluoromethane sulfonate. After a colorless solution was obtained by stirring overnight, it was heated to 65 C in a vacuum oven and degassed. The temperature was gradually increased in the vacuum oven to 95 C over several hours. This resulted in degassing and removal of THF. A rubbery solid of slightly yellow color was obtained. This was converted to a sheet in a thickness of 400 microns by compressing the material between hot plates at 125 C. Polyester film as release sheets and film spacers were used to form this film.

Substrates coated with a dye layer and tungsten oxide as described in Example 1 were used and the electrolyte film was laminated between these with the coatings touching the electrolyte. Lamination was done in a diaphragm laminator (model L036A from P. Energy, Italy) at 145° C. The laminate was first subjected to vacuum in order to remove air bubbles prior to applying the pressure. The sample was cooled under pressure and removed. The sample size was 5.5 cm×3 cm where the substrates were slightly offset in the longer direction from where after lamination coatings of tungsten oxide and the dye layer were removed from the exposed (offset) area to attach the busbars. The active device area which was laminated was 3 cm×4 cm. Conductive busbars were applied at one edge of each of the substrate and powered at 2V with tungsten oxide side being negative. The sample colored from 72% optical transmission colorless sample down to 14.5% optical transmission in 1,000s to a blue color. Optical transmission was measured at 550 nm.

Example 3: Optical Characterization of an EC Cell and Determination of Solar Heat Gain Coefficient (SHGC) at the Center of the Window in an IGU An electrochromic cell was fabricated by using two conductively coated pieces of soda-lime glass in a thickness of 2.3 mm. These had a fluorine doped tin oxide coating with a surface resistance of 15 ohms/square (TEC™15 glass obtained from NSG in Toledo, Ohio). The glass size was about 14 cm×9 cm. One of the conductive coatings was further coated with a tungsten oxide coating containing about 30 mole % of lithium oxide. The tungsten oxide coating was still further coated with 125 nm thick layer of LiAlF$_4$. The substrate perimeter (about 1 cm wide) was cleaned to remove the tungsten oxide and the LiAlF4 coating. This was assembled with the second piece of TEC™ 15 glass with the coated sides facing each other by a perimeter epoxy sealant which had 300 micron sized glass spherical spacers to control the distance between the two and form a cavity. The uncoated TEC™ 15 had two holes about 2 mm in diameter drilled near the diagonal corners so that electrolyte could be introduced into the cavity. The cavity was filled with an electrolyte containing a redox dye and the holes were plugged and sealed. The electrolyte was 0.2M lithium bis(trifluoromethanesulfonyl)imide in propylene carbonate and further comprised of 0.025M phenothiazine (dye) and 4 wt % of polymethylmethacrylate (Elvacite™ from <Lucite International, Cordova, Tenn.).

The optical spectra of the cell was noted in the bleached (not colored) and the colored state by coloring first at 1V and then coloring deeper (fully colored) at 1.3V. This measurement was made both in transmission and reflection and is shown in FIGS. 10 and 11. The reflection data was collected from both sides and was quite similar, however, the reported data in FIG. 11 has been taken from the surface which is located closer to the tungsten oxide coating in the EC device. The SHGC of an IGU formed with this EC glass and another piece of passive glass (see FIG. 6, where EC glass is 60a and the passive glass is 60b) was calculated at the center of the window. The tungsten oxide coating in EC element 60a was placed so that it was closer to surface 1. The passive glass was 4 mm thick Optiwhite Energy Advantage™ from NSG. This glass had a Low-E coating on surface 3. The SHGC in the bleached state was 51.4% (or 0.514) and in fully colored state was 7.0% (or 0.07). The visible light transmission in these two states through the IGU was 64.5 and 4.1% respectively.

Another EC cell was made in a similar fashion where the dye was changed to 1-(ferrocenylmethyl)-1'-methyl-4,4'-Bipyridinium bis(trifluoromethanesulfonoyl)imide. The optical transmission and reflection spectra for this EC cell are shown in FIGS. 12 and 13 respectively in bleached (clear), partially colored (colored at 1V) and in fully colored (clored at 1.3V) states. This was similarly modelled for SHGC in an IGU configuration by changing the passive glass element. The results are shown in the Table below for bleached and the fully colored states. The Optiwhite™ and Suncool™ glasses from NSG have a Low-e coating and is configured to be located on surface 3 of the IGU as shown in FIG. 6.

| Passive element | SHGC in Bleached state, % | SHGC in the Colored state, % | Visible light Transmission, bleached, % | Visible light transmission. Colored, % |
| --- | --- | --- | --- | --- |
| 4 mm clear soda-lime glass (mid-iron) | 54.0 | 16.3 | 66.5 | 12.2 |
| 4 mm Optiwhite ™ Energy Advantage | 51.3 | 12.3 | 62.4 | 12.5 |
| 4 mm Suncool ™ 70/40 Pro T | 40.7 | 11.6 | 59.7 | 12.0 |

The foregoing description of the invention has been presented for purposes of illustration and description and is not intended to be exhaustive or to limit the invention to the precise form disclosed, and obviously, many modifications and variations are possible considering the above teaching. The embodiments were chosen and described to best explain the principles of the invention and its practical application to thereby enable others skilled in the art to best utilize the invention in various embodiments and with various modifications as are suited to the use contemplated. It is intended that the scope of the invention be defined by the claims appended hereto.

REFERENCES

1. Maged A. Osman, Vikas Mittal, Massimo Morbidelli, and Ulrich W. Suter, *Polyurethane Adhesive Nanocomposites as Gas Permeation Barrier*, Macromolecules, 2003, 36 (26), pp 9851-9858
2. Data from Covestro: https://www.tpu.covestro.com/en/Technologies/Properties/Permeability
3. Daniel Fragiadakis, Shichen Dou, Ralph H. Colby, and James Runt, Molecular Mobility, Ion Mobility, and Mobile Ion Concentration in Poly(ethylene oxide)-Based Polyurethane Ionomers, Macromolecules (2008), 41, 5723-5728
4. Hart, R., Selkowitz, S. & Curcija, C. "Thermal performance and potential annual energy impact of retrofit thin-glass triple-pane glazing in US residential buildings." Build. Simul. (2019) 12: 79. https://doi.org/10.1007/s12273-018-0491-3
5. Edwin S. Raj* and Jonathan Booth, Johnson Matthey Technol. Rev., (2017), 61, (2), p-156 to 164

The invention claimed is:
1. A polymeric ion-conductive electrolyte sheet comprising:

i) thermoplastic polymer formed using at least three monomers;
ii) a melting point or a flow point in excess of about 90° C. and less than about 170° C.;
iii) optical haze less than 5%, and
iv) a thickness of greater than 100 μm and less than 1,000 μm.

2. The polymeric ion-conductive sheet of claim 1, having an ion-conductivity in a range of about $10^{-2}$ to $10^{-5}$ S per square cm of the sheet area when measured at 25° C.

3. The polymeric ion-conductive sheet of claim 1, wherein the thermoplastic polymer is selected from a fluoropolymer, polyurethane, polyvinyl butyral, acrylic, polyester, polyurea, polycarbonate, polyvinyl acetate, or a combination thereof.

4. The polymeric ion conductive sheet of claim 1, wherein the electrolyte sheet further comprises a plasticizer and a salt, wherein the salt can be solubilized by the said plasticizer.

5. The polymeric ion conductive sheet of claim 4, wherein the said plasticizer solubilizes at least one monomer used to form the said thermoplastic polymer.

6. The polymeric ion conductive sheet of claim 1, further comprising a UV stabilizer.

7. The polymeric ion conductive sheet of claim 1, wherein the polymeric ion conductive sheet further comprises at least one of non-electronically conductive nanoparticles and surface modified non-electronically conductive nanoparticles.

8. The polymeric ion conductive sheet of claim 1, wherein the polymeric ion conductive sheet contains at least one unreacted monomer which is not polymerized in said thermoplastic polymer.

9. The polymeric ion conductive sheet of claim 8, wherein the polymeric ion conductive sheet contains a catalyst capable of polymerizing at least one additional monomer by radiation.

10. The polymeric ion conductive sheet of claim 9, wherein the at least one unreacted monomer has crosslinkable groups.

11. The polymeric ion conductive sheet as in claim 8, wherein the unreacted monomer is soluble in a plasticizer.

12. An electrochromic product comprising the polymeric ion conductive sheet of claim 1.

13. A polymeric ion-conductive sheet comprising:
i) a thermoplastic polymer selected from one of polyurethane, polyester, polyurea, polycarbonate, or a combination thereof, and
ii) further comprising at least one of non-electronically conductive nanoparticles and surface modified non-electronically conductive nanoparticles, wherein the polymeric ion-conductive sheet has an optical haze of less than 5%,
iii) a thickness of greater than 100 μm and less than 1,000 nm.

14. An electrochromic device containing the polymeric ion-conductive electrolyte sheet of claim 1.

15. An electrochromic device containing the polymeric ion-conductive sheet of claim 13.

* * * * *